(12) United States Patent
Fidaali et al.

(10) Patent No.: US 7,856,438 B2
(45) Date of Patent: Dec. 21, 2010

(54) DEVICE AND METHOD FOR SEMANTIC ANALYSIS OF DOCUMENTS BY CONSTRUCTION OF N-ARY SEMANTIC TREES

(76) Inventors: Kabire Fidaali, 18, rue d'Aval'eau, F-95270 Asnières sur Oise (FR); Hermann Prignitz, 4, Hameau de Prouillata - F-64100, Bayonne (FR)

( * ) Notice: Subject to any disclaimer, the term of this patent is extended or adjusted under 35 U.S.C. 154(b) by 311 days.

(21) Appl. No.: 11/920,186

(22) PCT Filed: May 11, 2006

(86) PCT No.: PCT/FR2006/001055

§ 371 (c)(1),
(2), (4) Date: Mar. 3, 2008

(87) PCT Pub. No.: WO2006/120352

PCT Pub. Date: Nov. 16, 2006

(65) Prior Publication Data

US 2009/0077113 A1 Mar. 19, 2009

(30) Foreign Application Priority Data

May 12, 2005 (FR) .................................. 05 04765

(51) Int. Cl.
*G06F 7/00* (2006.01)
(52) U.S. Cl. ...................................... 707/755; 707/829
(58) Field of Classification Search ................. 707/100, 707/101, 102, 104.1, 755, 829, 999.1, 999.102
See application file for complete search history.

(56) References Cited

U.S. PATENT DOCUMENTS 7,013,264 B2 * 3/2006 Dolan et al. .................. 704/9

(Continued)

FOREIGN PATENT DOCUMENTS

EP 0 387 226 A1 9/1990

(Continued)

OTHER PUBLICATIONS

International Search Report, dated Aug. 23, 2006, corresponding to PCT/FR2006/001055.

(Continued)

*Primary Examiner*—Hosain T Alam
*Assistant Examiner*—Amy Ng
(74) *Attorney, Agent, or Firm*—Christie, Parker & Hale, LLP

(57) ABSTRACT

A semantic analysis device includes a structural and semantic database and a document interpreter. The document interpreter includes an N-ary tree controller for constructing an N-ary tree from a decomposition of a document and an ordered sequence of verbal entities and structural and/or semantic constraints. The N-ary tree includes a root node formed by a primary verbal entity and structures formed from a subordinate verbal entity related directly or indirectly to the root node by a link having a connecting characteristic. The document interpreter also includes a semantic tree controller for determining object and activity types from the N-ary tree and database, activate by certain nodes of the N-ary tree, for constructing a semantic tree with principal nodes for objects and activities and connected by semantic relationships from connecting characteristics of the N-ary tree, and to which attributes are associated based on other nodes of the N-ary tree.

12 Claims, 10 Drawing Sheets

U.S. PATENT DOCUMENTS

2004/0167771 A1* 8/2004 Duan et al. .................... 704/10
2004/0205737 A1* 10/2004 Margaliot et al. ........... 717/143

FOREIGN PATENT DOCUMENTS

EP          0 467 527 A2    1/1992

OTHER PUBLICATIONS

Rajman, et al. "Niveaux De Traitement Du Langage Naturel" 2004, Cours TIDT, EPFLl; Lausanne, XP002352036, 23 Pages.

C. Fuchs & AL. "Linguistique-et Traitements Automatiques des Langues" 1993, Hachette, Paris, France, XP002352038, pp. cover, 106, 107, 144, 145, 154 and 155.

Rajman, et al. "Analyse Syntaxique: Introduction, Algorithme CYK" 2004, Cours TIDT, EPFL, Lausanne, XP002352037, 41 Pages.

* cited by examiner

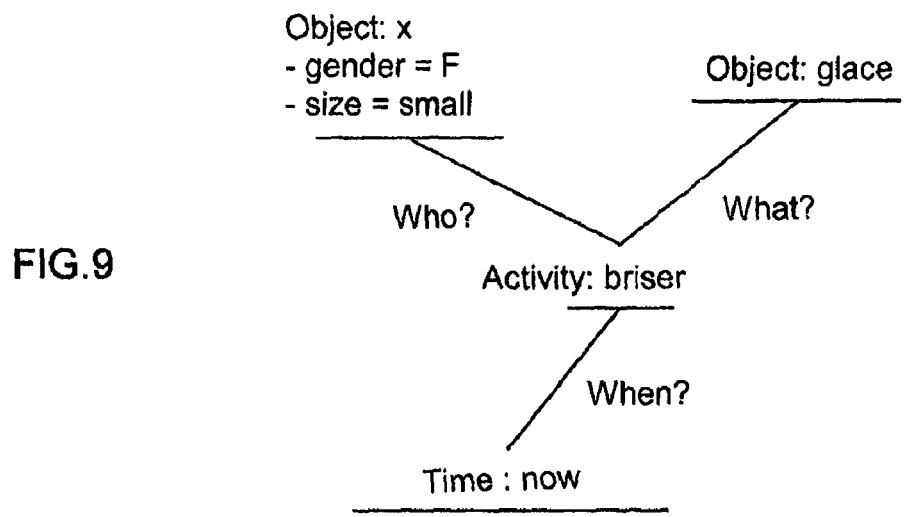
FIG.9
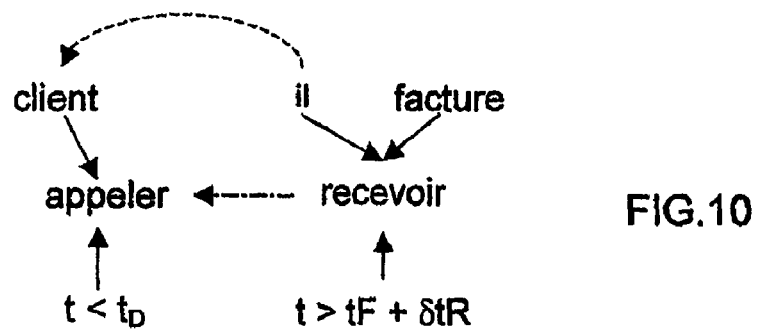
FIG.10
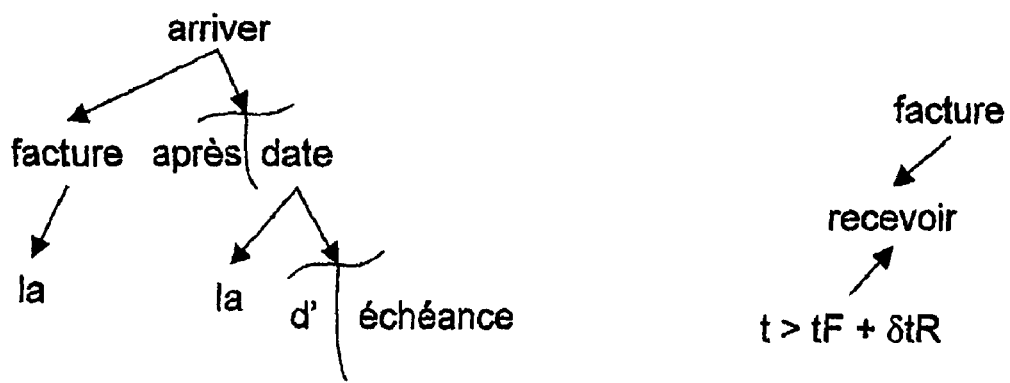 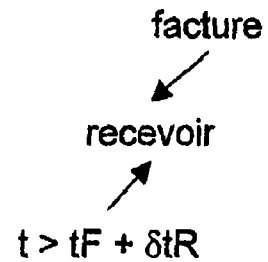
FIG.11A    FIG.11B

DEVICE AND METHOD FOR SEMANTIC ANALYSIS OF DOCUMENTS BY CONSTRUCTION OF N-ARY SEMANTIC TREES

CROSS-REFERENCE TO RELATED APPLICATION

This application is a National Phase Patent Application of International Application Number PCT/FR2006/001055, filed on May 11, 2006, which claims priority of French Patent Application Number 0504765, filed on May 12, 2005.

BACKGROUND

The invention relates to the field of automatic analysis of documents and the use of the results of such analyses.

By "document" is meant here a set of data representing known or recognisable characters. It may be, in particular, a text made up of an ordered sequence of verbal entities such as words, groups of words, figures or alpha-numeric groups, for example.

Moreover, the term "analysis" here means any type of check intended to determine whether a document has a meaning, possibly taking into account its context.

Moreover, the phrase "use of the results" here denotes any operation or process that can be applied to an analysed document, for example with a view to translation, optionally simultaneous, or with a view to information filtering (for example within the framework of electronic messaging management) or for the purpose of correcting spelling and/or grammar, or with a view to transcribing voice dictation, or for the purpose of generating texts (such as abstracts or summaries), or for the purpose of carrying out a search, using a search engine, into textual information accessible on private or public network servers (such as internet servers).

Numerous applications can be used to process plain language. They are based on different techniques such as, for example, syntax analysers, semantic networks or Bayesian models, sometimes associated with neuronal networks or modal fuzzy logic.

These techniques have certain advantages over first generation search engines which were limited by the use of key words.

However, in some fields, these techniques are inadequate or even useless in the matter of the processing of plain language owing to the fact that they neglect some of the information contained in the documents that are to be analysed.

SUMMARY OF INVENTION

This results essentially from the major difficulty which a machine encounters in automatic processing of plain language because of its ambiguity and polysemy. The term "ambiguity" denotes a statement which has a number of interpretations and the term "polysemy" denotes words which have a number of meanings (polysemy is one source of ambiguity among others).

In fact, it is extremely difficult or even impossible to model language without modelling meaning. Moreover, as meaning is nothing when it is not understood, automatic processing should integrate modelling of the mechanisms of human understanding of meaning. In fact, it is not even known if human understanding can be modelled.

As no known technique was entirely satisfactory the invention therefore sets out to improve the situation and in particular to allow the correct interpretation of a document by automatically evaluating the role played by each of the verbal entities (or words) which make up this document (such as a text) in terms of syntax, semantics and context.

To this end it proposes a device for semantic analysis of documents, comprising a structural and semantic database and a document interpreter which has the task of determining whether a document has a meaning, using the database.

This device for semantically analysing documents is characterised in that its document interpreter comprises:
- an n-ary tree controller tasked with constructing a structural n-ary tree from the breakdown of a document which is to be analysed into an ordered series of verbal entities and structural and/or semantic constraints, the n-ary structural tree comprising a root node formed by a primary governing verbal entity, and structures formed from a secondary subordinate verbal entity and attached either directly or indirectly to the root node by a link having at least one connectional characteristic, a secondary subordinate verbal entity being in turn capable of becoming a governing verbal entity,
- a semantic tree controller tasked with determining, at least from the structural n-ary tree and the database, categorising entities of the object type and activity type, activated by certain nodes of the n-ary tree, in order to construct a semantic tree provided with principal nodes made up of the categorising entities of object and activity and linked by semantic relations arising from connectional characteristics of the n-ary tree and with which attributes are associated as a function of the characteristics of the other nodes of the n-ary tree and their respective links.

In other words, the semantic tree controller is tasked, firstly, with transforming each n-ary (structural) tree into a semantic tree, secondly, extracting from it categorising entities, by creating semantic links between categorising entities extracted on the basis of the interpretation of the structural links that link the verbal entities which have activated these categorising entities, and thirdly by assigning to each extracted categorising entity a list of at least one attribute according to a model (or pattern) defined by a lexicon.

The term "lexicon" here denotes a list of entries (the verbal entities) each defined by:
- categorising structural characteristics, for example verb, noun, etc., gender, number, etc., and/or
- structural constraints, i.e. agent diagrams (connection potentials), and/or
- generic semantic characteristics, i.e. a breakdown to the underlying ontologies, and/or
- semantic constraints specific to each structural class, i.e. semantic compatibility relations which exploit the generic semantic characteristics, and/or
- lexical functions, and/or
- patterns (each having a semantic connection model and a list of properties (or attributes)) serving as models in the construction of the nodes of the semantic tree.

Moreover, a constraint is a regulated link defining a connectional characteristic.

It is also optionally possible to assign to the attributes values obtained from the nodes of the n-ary tree which have not yet been exploited.

By "categorising entity of the object type" is meant here an abstraction obtained (essentially) by categorising objects in the real world (such as for example a table, a star or a rose) or abstract ideas which function as metaphors for real objects (such as feelings, for example), generally referenced by nouns (the converse is not necessarily true).

Moreover, the term "categorising entity of the activity type" here refers to an abstraction obtained (essentially) by categorising actions in the real world (such as for example going or moving) or abstract ideas which function as metaphors of real activities (such as for example thinking or loving) which can be referenced either (preferably) by verbs or by nouns (in this case the construction of the semantic tree requires an additional step consisting of applying a lexical function in order to transform the noun structure into a verb structure (this lexical function forming part of the definition of the noun in question)—by way of example the phrase "the movement of the table" may be converted into the phrase "moving the table"), or by any other structural category according to a process which is appropriate to the language under consideration.

Moreover, according to the invention, a document has at least one meaning if it is possible to construct a semantic tree from its verbal entities.

The device according to the invention may have other features which may be taken separately or together, specifically:

- its document interpreter may comprise a binary tree controller tasked with constructing a structural binary tree from the breakdown of a document into an ordered series of verbal entities and structural and/or semantic constraints, this structural binary tree comprising leaves, each associated with a verbal entity of the series and constituting one of the two son nodes attached to a father node, and a root node, constituting a father node and associated with all or some of the verbal entities in the series. In this case, the n-ary tree controller is tasked with constructing each n-ary tree from a structural binary tree;
- its document interpreter may comprise a breakdown module tasked with breaking down each set of data defining a document which is to be analysed into an ordered series of verbal entities;
- its document interpreter may comprise a semantic analyser tasked with determining the semantic compatibility relations between principal nodes of the object type and/or principal nodes of the activity type of at least one semantic tree;
- its semantic analyser may be tasked with determining the relations between principal nodes of at least one semantic tree among the spatial, temporal, causal, anaphoric and cataphoric relations;
- its semantic analyser may be tasked with carrying out a diagnosis relating to the analysis of a document and delivering a message that conveys the results of this diagnosis. This diagnostic message specifies the nature of the problems encountered during the analysis of the document. It may for example contain, for this purpose, information representing the difficulties encountered during the analysis of a document, and/or possibilities of different interpretations of a sentence (resulting from unresolved ambiguities), and/or at least one unknown word, and/or at least one grammatical error, and/or at least one error of construction, and/or at least one nonsensical item, and/or a list of unresolved ambiguities.

The invention also proposes a method of semantically analysing documents comprising:

- constructing a structural n-ary tree from a breakdown of a document which is to be analysed into an ordered series of verbal entities and structural and/or semantic constraints, the structural n-ary tree comprising a root node formed by a primary governing verbal entity and structures formed by a secondary subordinate verbal entity and attached either directly or indirectly to the root node by a link having at least one connectional characteristic, a secondary subordinate verbal entity being in turn capable of becoming a governing verbal entity,
- determining, at least from the structural n-ary tree and data stored in a structural and semantic database, the categorising entities of the object type and activity type activated by certain nodes of the n-ary tree, in order to construct a semantic tree provided with principal nodes consisting of the object and activity categorising entities and linked by semantic relations arising from the connectional characteristics of the n-ary tree and associated with attributes that are a function of the characteristics of the other nodes of the n-ary tree and their respective links.

The method according to the invention may have other features which may be taken separately or together, specifically:

- before constructing an n-ary tree it is possible to construct a structural binary tree based on the breakdown of a document into an ordered series of verbal entities and structural and/or semantic constraints, the structural binary tree comprising leaves, each associated with a verbal entity in the series and constituting one of the two son nodes attached to a father node, and a root node, constituting a father node and associated with all or some of the verbal entities in the series. In this case, each n-ary tree is constructed from a structural binary tree;
- before constructing a binary tree or an n-ary tree, each set of data defining a document to be analysed may be broken down into an ordered series of verbal entities;
- the semantic compatibility relations between principal nodes of the object type and/or principal nodes of the activity type of at least one semantic tree may be determined;
- it is possible to determine whether the document analysed has a meaning by determining the relations between principal nodes of at least one semantic tree, selected from among the spatial, temporal, causal, anaphoric and cataphoric relations;
- after having constructed a semantic tree it is possible to carry out a diagnosis relating to the analysis of a document and then to deliver a message conveying the results of the diagnosis. This diagnostic message specifies the nature of the problems encountered during analysis of the document. It may for example contain, for this purpose, information representing the difficulties encountered during the analysis of a document, and/or different possible interpretations of a sentence, and/or at least one unknown word, and/or at least one grammatical error, and/or at least one error of construction, and/or at least one nonsensical item, and/or a list of unresolved ambiguities.

BRIEF DESCRIPTION OF THE DRAWINGS

Further features and advantages of the invention will become apparent from a study of the detailed description that follows, and the attached drawings, wherein.

The accompanying drawings may serve not only to complement the invention but may also help to define it, as necessary.

DETAILED DESCRIPTION

The invention sets out in particular to allow structuring, by meaning, of the information contained in a document which is to be analysed, notably using a model for automatically resolving at least some of the ambiguities and polysemies inherent in plain language documents.

Figure 1:
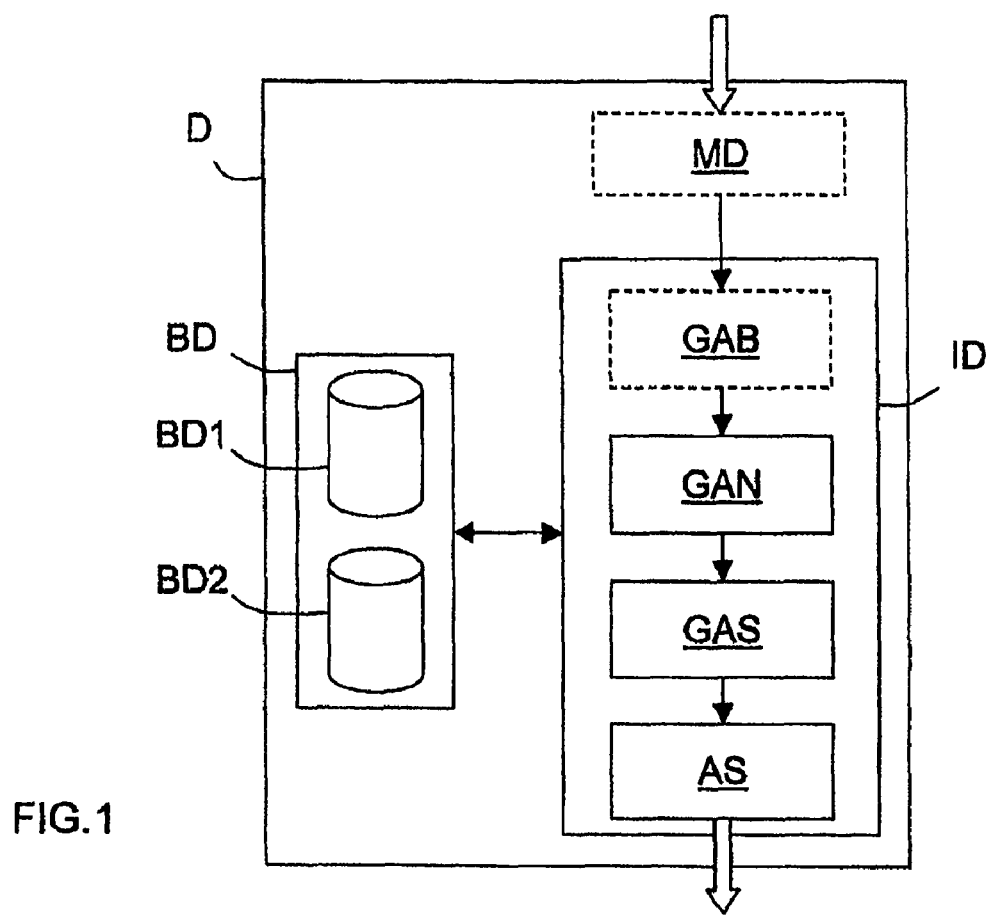
FIG. 1 shows in a highly schematic and functional manner an embodiment of a device for semantic analysis of documents according to the invention, FIG. 2 schematically shows the main steps of an example of an algorithm for breaking a document down into verbal entities, FIG. 3 schematically shows the main steps of an example of an algorithm for constructing a structural binary tree based on the breakdown of a document into verbal entities, FIG. 4 schematically shows the main steps of an example of an algorithm for constructing a structural n-ary tree from a structural binary tree.

Reference will be made first of all to FIG. 1 to describe an embodiment of a device D for semantic analysis of documents, according to the invention.

In the description that follows, the device D is assumed, as a non-restrictive example, to be dedicated to automatically resolving ambiguities and polysemies in text-type documents.

A device D of this kind may for example be installed in a computer or an applications server, some of whose resources it uses, notably its computing power (CPU).

An analysis device D according to the invention comprises at least one structural and semantic database BD and a document interpreter ID.

The database BD, also referred to as a lexicon (or reference lexicon), comprises words (or verbal entities) which are assigned syntactic and semantic properties and composition rules (or links). The properties and links (or rules) constitute data which serve to construct categorising (or conceptual) entities of the activity and object type.

The definitions of the categorising entities have already been given hereinbefore. Moreover, the term "property" here denotes an abstraction obtained by categorising ideas of a defining nature based on sets of values generally referenced by nouns (such as for example colour or size). A value is by definition an abstraction directly referenced by an adjective and necessarily linked to a property. The values may generally be associated with quantitative ("objective") and/or qualitative ("subjective") scales, as will be seen hereinafter in the introduction to the concept of metrics.

The words are categorised within structural classes of verbs, nouns, adjectives, adverbs and structural words. All these categories can be subdivided for example into sub-classes, sub-sub-classes and so on (as will be seen hereinafter with reference to FIG. 15 in which the $NO^A$, $NO^U$ and the like are sub-classes of the class of nouns).

A categorising entity is tasked with freely producing ambiguous meaning by association with other categorising entities, under the control of properties which limit their freedom with respect to a controlled syntactic and semantic structure.

The links are tasked with controlling the properties through pragmatic overdeterminations (weak or strong pragmatic constraints), either arising from the document (text) itself or arising from the general context. By "weak pragmatic constraints" are meant here the fact that no general reference work in open context would be able to exhaust all the possible interpretations of a textual message. The links offer flexibility to the process of resolving ambiguity (or disambiguation) by activating or deactivating certain rules of the properties depending on the particular needs, for example by giving preference to semantics over syntax when an ungrammatical sentence obviously has a meaning. Their role in disambiguation is essential.

As illustrated in FIG. 1, the database BD can be subdivided into a general database BD1 and a specialised database BD2.

The general database BD1, also referred to as the general lexicon, comprises entries, typically several tens of thousands (for example 80,000) which define inflected forms (typically several hundred thousand, e.g. more than 300,000), provided with data which convey the weak pragmatic constraints involved in particular in disambiguation of the intrinsic meaning of a text which preserves its general polysemy.

The specialist database BD2, also referred to as the specialist lexicon, contains data that convey the linguistic peculiarities of a precise context (strong pragmatic constraints) that make it possible to limit the general polysemy of the messages in order to extract from them one or more locally pertinent interpreted meanings. The more detailed the definition of the context, the easier it is to arrive at a final interpretation.

The semantic properties are organised according to a taxonomy and distributed on the axes of the three multi-dimensional primary reference systems—material real, intentional and contextual. They are independent of the classical syntaxes which only weakly integrate the semantic parameters. Consequently, they are not specific to a particular language.

Each multi-dimensional primary reference system has axes of breakdown of the semantic properties and its own composition logic. The logics associated with the three primary reference systems are of the modal type.

The contributions to the disambiguation of each primary reference system are calculated according to an evaluation of one or more resultants which fix the parameters of its influence on the general process of disambiguation. If the intentional and contextual axes lend themselves to the calculation of such resultants, by contrast the material real brings a differentiated contribution, in virtually all known languages, which cannot always be reduced to a global component. Thus, the semantic properties relating to the real are exploited while preserving the four conventional axes of a four-dimensional space-time space.

The categorising entities are dynamic objects of a six-dimensional linguistic universe provided with a multimodal logic algebra. A set of compatibility rules between properties govern the interactions between categorising entities.

The document interpreter ID is tasked with determining whether a document has a meaning, using the database BD and processing functions that make use of a mathematical model, to which we will return later. It comprises at least one n-ary tree controller GAN and a semantic tree controller GAS, and optionally a semantic analyser AS.

The n-ary tree controller GAN is tasked with constructing, by means of its processing functions and the database BD, a structural n-ary tree starting from a breakdown of a document to be analysed into an ordered series of verbal entities (or words, or groups of words, or alpha-numeric groups) and structural and/or semantic constraints selected from and defined in the database BD.

As a text (or document) is generally made up of sentences, in the description that follows each sentence will be deemed to form all or part of an ordered series of verbal entities.

It is important to note that the ordered series of verbal entities are supplied for example by a document breakdown module MD which, as in the example shown in FIG. 1, is part of the device D. However, this is not obligatory. In fact, if the device D does not have a document breakdown module MD, the series may be supplied to it directly by external equipment.

The document breakdown module MD, if it exists, is tasked with breaking down each set of data which defines a document (such as a text) into an ordered series of verbal entities to be analysed. In most situations, after a document has been broken down into an ordered series of verbal entities, there is no step of identifying the language and its syntactic structure. The latter, if not specified, is identified in the following step. However, it is possible to envisage at this stage determining separators which are specific to a given language, such as Chinese, for example.

Each structural n-ary tree, which is constructed by the n-ary tree controller GAN, comprises a root node which is associated with a so-called primary governing verbal entity and structures which are formed by a so-called secondary subordinate verbal entity and attached either directly or indirectly to the root node by a link having at least one connectional characteristic.

The positioning of a link (identified by its connectional characteristic(s)) in a binary structural tree is carried out by applying the structural and/or semantic constraints supplied by the connecting potentials which are associated with the elementary data (obtained from the database (or lexicon) BD1 or BD2) of the two verbal entities in question.

Certain secondary subordinate verbal entities may in turn become governing verbal entities.

Each structural n-ary tree may be constructed from a binary tree which may itself be constructed from an ordered series of verbal entities, optionally supplied by the breakdown module MD.

In this case, the document interpreter ID comprises a structural binary tree controller, as shown in FIG. 1. This is tasked with rebuilding each ordered series of verbal entities that it receives into a structural binary tree. More precisely, as will be seen hereinafter, two adjacent nodes are combined to form a new node, as to begin with there are only leaves.

A structural binary tree comprises a root node which represents all the verbal entities of a sentence (or part of a sentence) to be processed, and which constitutes a father node for two son nodes resulting from its binary breakdown. Depending on the number of verbal entities contained in a son node it constitutes either a leaf of the binary tree or a father node which can be broken down in turn, in binary manner, into two son nodes.

In other words, the binary breakdown of the root node gives two son nodes which can in turn be father nodes that are subjected to binary breakdown and so on, until every leaf of the binary tree is occupied by a verbal entity (word) of the (part of a) sentence being processed.

This binary breakdown is carried out as a function of structural and/or semantic constraints stored in the database BD. Preferably, the user of the device D does not intervene at this stage. His intervention may possibly be reduced to defining local rules which can override certain general rules (such as for example vetoing the application of gender agreement rules).

The binary tree controller GAB and/or the n-ary tree controller GAN may have a function of identifying the lexical units (or verbal entities) belonging to the language used to draft (or dictate) a document, thus making it possible to show up the lexical ambiguities.

The semantic tree controller GAS is tasked with determining the categorising entities of the object type and activity type on the basis of the structural n-ary tree and the data stored in the database BD.

It should be remembered here that a categorising entity of the object type is an abstraction obtained (essentially) by categorising objects of the real world or abstract ideas that function as metaphors for real objects, generally referenced by nouns. Moreover, a categorising entity of the activity type is an abstraction obtained (essentially) by categorising actions in the real world or abstract ideas that operate as metaphors for real actions which can be referenced either (preferably) by verbs or by nouns (in this case the construction of the semantic tree requires an additional step comprising applying a lexical function in order to transform the noun structure into a verb structure).

As will be seen hereinafter, the semantic tree controller GAS may, in certain situations, make use of the information contained in one or more other n-ary trees corresponding to other sentences in the same document in order to construct a semantic tree. This is the case, in particular, in the presence of ambiguities of the anaphoric or cataphoric type.

Each semantic tree is made up of principal nodes each of which is associated with at least one categorising entity of the object type or activity type, which is activated by certain nodes of the n-ary tree, and which are linked by semantic relations arising from connectional characteristics of the n-ary tree and to which attributes are assigned as a function of the characteristics of the other nodes of the n-ary tree and their respective links.

The semantic analyser AS is tasked with determining the semantic compatibility relations between the principal nodes of the object type and/or the principal nodes of the activity type of at least one semantic tree.

The semantic compatibility relations exploit the semantic characteristics. For example, only a "human", who is a categorising entity of the object type, can "think", which is a categorising entity of the activity type.

The semantic analyser AS constitutes a diagnostic tool for analysing documents. It may for example specify the difficulties encountered during the analysis of a document (or sentence) and/or different possible interpretations of a sentence and/or unknown words and/or grammatical errors (for example failure to adhere to rules of agreement) and/or errors in construction and/or nonsensical items (for example rules of semantic compatibility not respected) and/or ambiguities which it has not been possible to resolve.

Thanks to the diagnoses provided it is then possible for example to classify messages or to resolve a problematic situation (by applying a local rule or by identifying a lack of information which prevents full understanding of a message), or to know why a message is deemed "incomprehensible". Moreover, when the diagnosis provided is comprehensible and itemised, automated actions may be carried out.

As indicated previously, the different elements that make up the document interpreter ID use processing functions that make use of a mathematical model. The latter is based on a number of algorithms which come into play on the links which are provided with at least one connectional characteristic and which are established between structures formed by a secondary subordinate verbal entity and a root node. More precisely, these algorithms make use of the properties of the entries in the database BD which have previously been converted into categorising entities the data and links of which constitute the properties.

As mentioned previously, the categorising entities constitute varieties distributed along axes grouped into three different primary reference systems. The varieties may interact and combine with one another in accordance with the rules of lexical, syntactic, semantic and pragmatic composition in a six-dimensional linguistic universe.

The processing of ambiguities is carried out transversely, not successively but interactively, as a function of the rules of compatibility of each categorising entity with other categorising entities.

The propensities of a number of categorising entities to coexist or exclude one another, by activation or deactivation of rules of compatibility, control the production of primary linguistic graphs, in the form of groups that make up structural trees (binary or n-ary).

The groups can be likened to syntagmas having syntactical and semantic properties. They inherit new availabilities of composition of a higher order which allow the creation of secondary linguistic graphs or supergroups which correspond roughly to informative sentences optionally supplemented by a diagnosis, for example in the form of a classification into "comprehensible information", "dubious information", "absurd information" or "out of context information".

It is important to note that the ideas of "primary" and "secondary", in relation to linguistic graphs, are there only to demonstrate the recursive nature of the construction. They convey a progression in complexity of the associations formed.

The mathematical model causes the data to interact freely with one another controlled only by the rules of compatibility of their respective properties. Various hypotheses are explored and are reduced, for example, by means of a hypothesis reducing method based on the modal system known as "S4" developed by Gerhard Gentzen.

The rules of compatibility are of a first and second level, and allow the earliest possible resolution of the different types of first level ambiguities which may appear in an ordered series of verbal entities (or sentence).

Compatibility algebra between the different varieties of categorising entities makes it possible to form groups of several categorising entities which are syntactically and semantically compatible. This compatibility algebra is made up of rules of semantic compatibility.

If there is only one mathematically possible supergroup, the sentence is totally disambiguated (and hence understood). By contrast, if a number of supergroups are mathematically possible, the phrase remains ambiguous (and hence not understood).

The supergroup can then be related to the original sentence (or document) in order to make use of the structured information that it contains.

For example, a supergroup may be compared with reference supergroups (defining pre-parameterised filters, optionally obtained from an analysis of questions—in plain language—posed by users or by other texts). It is also possible to carry out operations on sets of supergroups, such as for example calculations of distance or checks on coherence. It is also possible to use one or more supergroups to extract specific information, such as summaries, for example. It is also possible to use one or more supergroups to generate new messages.

Figure 2:
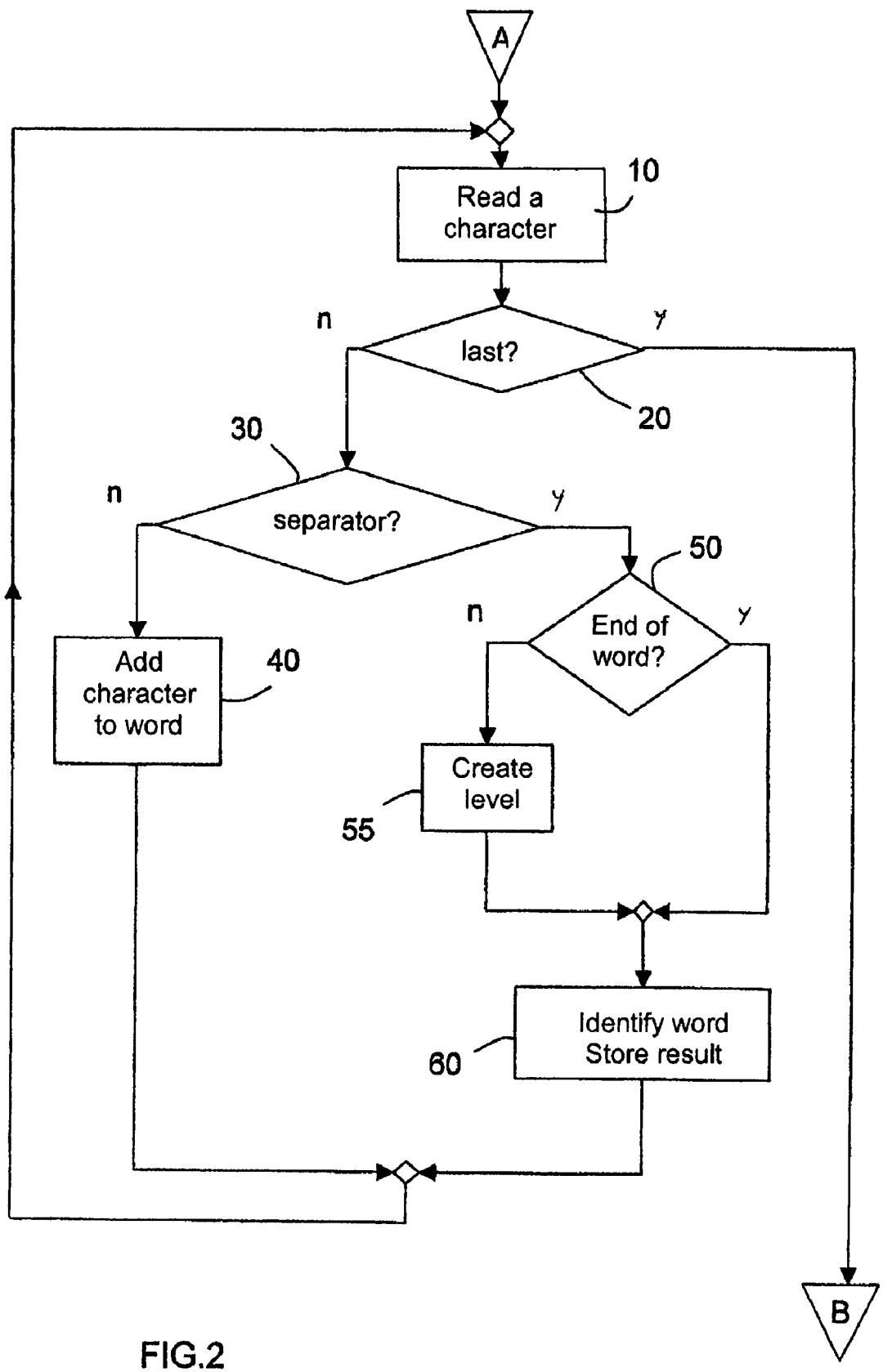

Reference is made to FIG. 2 in order to describe the main steps of an example of an algorithm for breaking down a document into verbal entities. This algorithm is used by the breakdown module MD of the device D according to the invention. It is important to note that when methods of breakdown other than the one described below are used, the breakdown module MD is adapted accordingly. Thus, it may be based on the use of transducers, for example.

At A, the breakdown module MD receives a document which is to be analysed. It may be for example a text in plain language. In a step 10 the breakdown module MD determines (reads) the first character in the document. Then in a step 20 the breakdown module MD runs a test to determine whether the character read is the last one in the document. If it is, the breakdown of the document ends at B. On the other hand, if the character read is not the last character in the document, the breakdown module MD runs a new test in a step 30 to determine whether the character read is a separator. If this is not the case, in a step 40 the breakdown module MD adds this character to the word being built up, then goes back to step 10 in order to recommence the steps of the algorithm with the next character of the document. By contrast, if the character read is not a separator, the breakdown module MD runs a new test in a step 50 to determine whether the character read is the last of a word being built up. If this is the case, in a step 60 the breakdown module MD identifies the word that has just been built up, then stores the word in a buffer memory before going back to step 10 to restart the steps of the algorithm with the next character of the document. By contrast, if the character read is not the last one in a word being built up, the breakdown module MD in a step 55 creates a level which produces a hyphen, then moves on to step 60.

The separators are either word separators (effectively leading to step 60), or separators of units of text of different logic levels interwoven with one another, such as segments, sentences, paragraphs or chapters.

This algorithm example is then applied to each character of a document right to the last one. This breakdown algorithm thus provides an ordered series of verbal entities consisting, respectively, of words, groups of words, figures or alphanumeric groups, generally separated by separators, the meaning of which is to be analysed.

The breakdown algorithm for the document can be implemented using a transducer, for example in the form of an automatic finite state device which optimises both the memory space needed and the performance.

Analysis of the meaning of an ordered series of verbal entities preferably starts by constructing a structural binary tree for each sentence in the document. When the document contains only one sentence, the entire ordered series of verbal entities serves to construct a binary tree. By contrast, when the document contains a number of sentences, each portion of the ordered series of verbal entities, corresponding to a sentence, serves to construct a binary tree.

Figure 3:
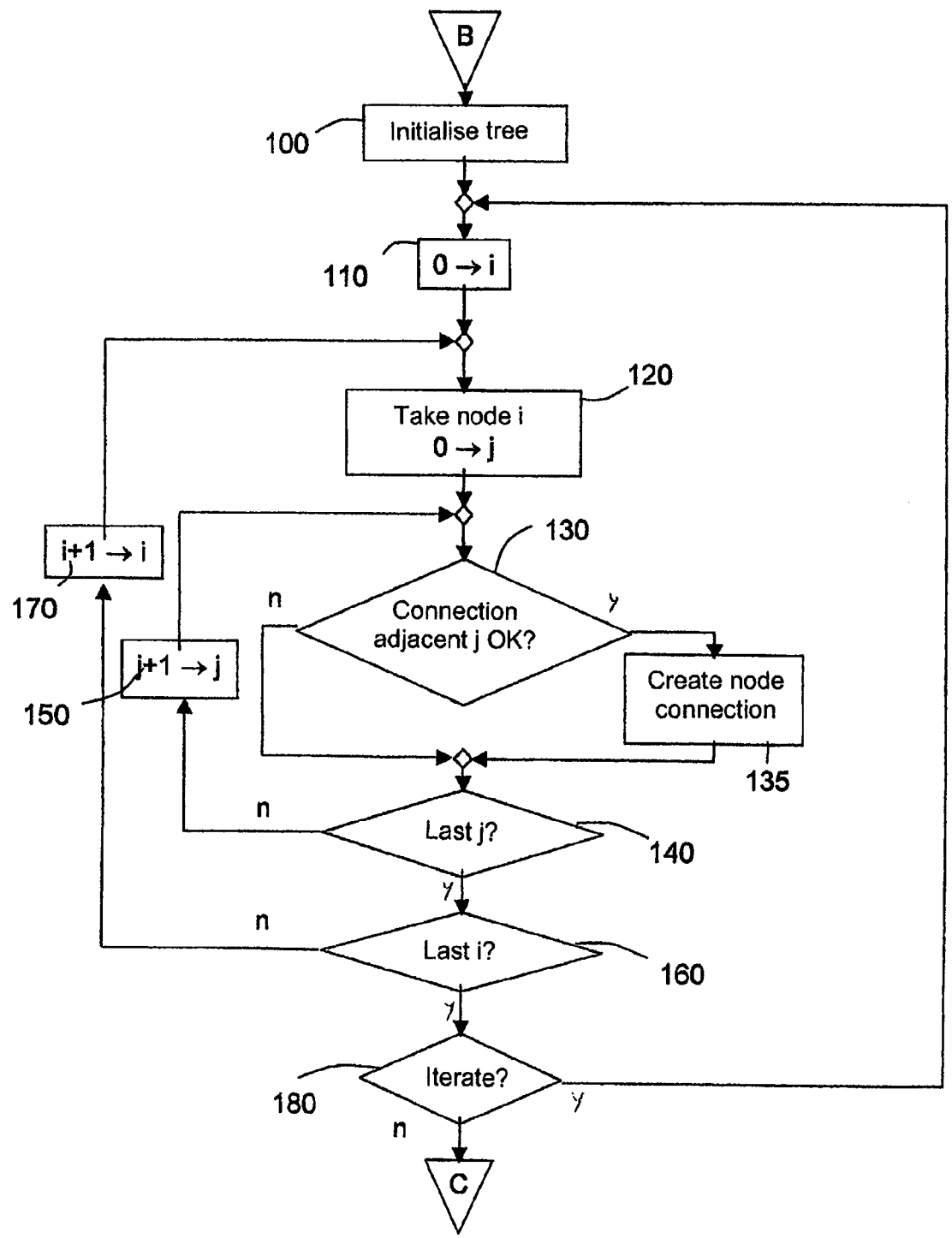

Reference will be made to FIG. 3 for a description of the main steps of an example of an algorithm for constructing a structural binary tree. This algorithm is run by the binary tree controller GAB of the device D according to the invention.

At B, the binary tree controller GAB receives an ordered series of verbal entities. This series is supplied for example by the document breakdown module MD which implements a breakdown algorithm of the kind described above. However, this is not obligatory. In fact, when the device D does not comprise a document breakdown module MD, the series may be supplied directly to the binary tree controller GAB by external equipment.

In a step 100, the binary tree controller GAB proceeds to initialise the structural binary tree which is to be constructed.

Then, in a step 110, the binary tree controller GAB resets to zero (0), for example, the value of a counter of father node i of the structural binary tree. This is only an example of a possible embodiment. For example, in the presence of a language capable of managing lists, the control of the counter may no longer be carried out by the programmer. An algorithm is then used to run through the physical structure which has been used to implement the list.

With the exception of the root node (i=0) which is made up of all the verbal entities of the sentence being processed, every other father node (i>0) of the binary tree represents the result of part of the binary breakdown of the verbal entities which occupy its own father node. The binary breakdown of the root node gives two son nodes which may in turn be father nodes that may be the object of binary breakdown and so on, until every leaf of the binary tree is occupied by a verbal entity (word) of the sentence processed.

The binary breakdown is carried out as a function of structural and/or semantic constraints stored in the database BD.

In a step 120 the binary tree controller GAB begins analysis of the father node i checked off by setting to zero (0) the value of a son node counter j of the structural binary tree. Then it proceeds with a breakdown of the verbal entities of the father node i being studied into two parts j and j' (not shown).

In a step 130 the binary tree controller GAB runs a test to determine whether the part j being studied resulting from the breakdown of the father node i being studied satisfies one or more selected structural and/or semantic constraints. If not, it moves on to step 140. In the opposite case, in a step 135, the binary tree controller GAB defines a new (connecting) node within the binary tree in order to assign it to the part j being studied, then it moves on to step 140. This new node j is then a son node of the father node i being studied.

In step 140 the binary tree controller GAB runs a test to determine whether the part j being studied which has just been processed is the last part resulting from the breakdown of the father node i being studied. If not, in a step 150, the binary tree controller GAB increases, by one unit, the counter of index j, then goes back to carry out step 130. On the other hand, if the part j being studied which has just been processed is the last part resulting from the breakdown of the father node i being studied, the binary tree controller GAB runs another test in a step 160 to determine whether there are other nodes i to be processed. If this is not the case, in a step 170, the binary tree controller GAB increases, by one unit, the counter of index i, then returns to carry out step 120. On the other hand, if there are no more nodes i to be processed, the binary tree controller GAB runs another test in a step 180 to determine whether the last iteration carried out in step 135 has created any new nodes and hence new connection possibilities which have to be explored. If this is not the case, the structural binary tree is formed and the construction algorithm for the binary tree ends at C. On the other hand, if an iteration has to be carried out, the binary tree controller GAB returns to carry out step 110.

Figure 7:
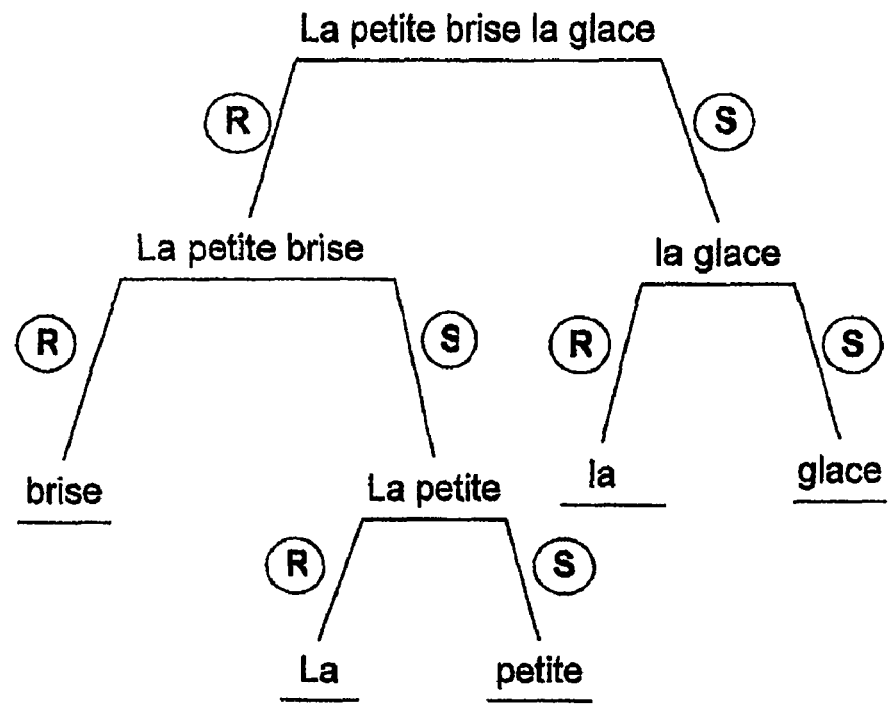

An example of a structural binary tree corresponding to the (French) sentence "La petite brise la glace" ["The child breaks the ice"] is illustrated in FIG. 7. In this example, the root node corresponds to the entire sentence "La petite brise la glace". A first son node of the root node contains the words "La petite brise", while the second son node of the root node comprises the words "la glace").

The first son node ("La petite brise") is thus a father node for its two son nodes associated respectively with the words "brise" and "La petite". The son node associated with the word "brise" is a leaf of the binary tree which cannot be broken down any further. The son node associated with the words "La petite" is thus a father node for its two son nodes associated respectively with the words "La" and "petite". The son nodes associated respectively with the words "La" and "petite" are leaves of the binary tree which cannot be broken down any further.

Similarly, the second son node ("la glace") is a father node for its two son nodes associated respectively with the words "la" and "glace". The son nodes associated respectively with the words "la" and "glace" are leaves of the binary tree which cannot be broken down any further.

Once a binary tree has been constructed the analysis of meaning of an ordered series of verbal entities continues by constructing a structural n-ary tree for each sentence in the document. The term "n-ary tree" here denotes a tree in which the breakdown of a father node results in any number of son nodes, this number varying from one father node to another.

Figure 4:
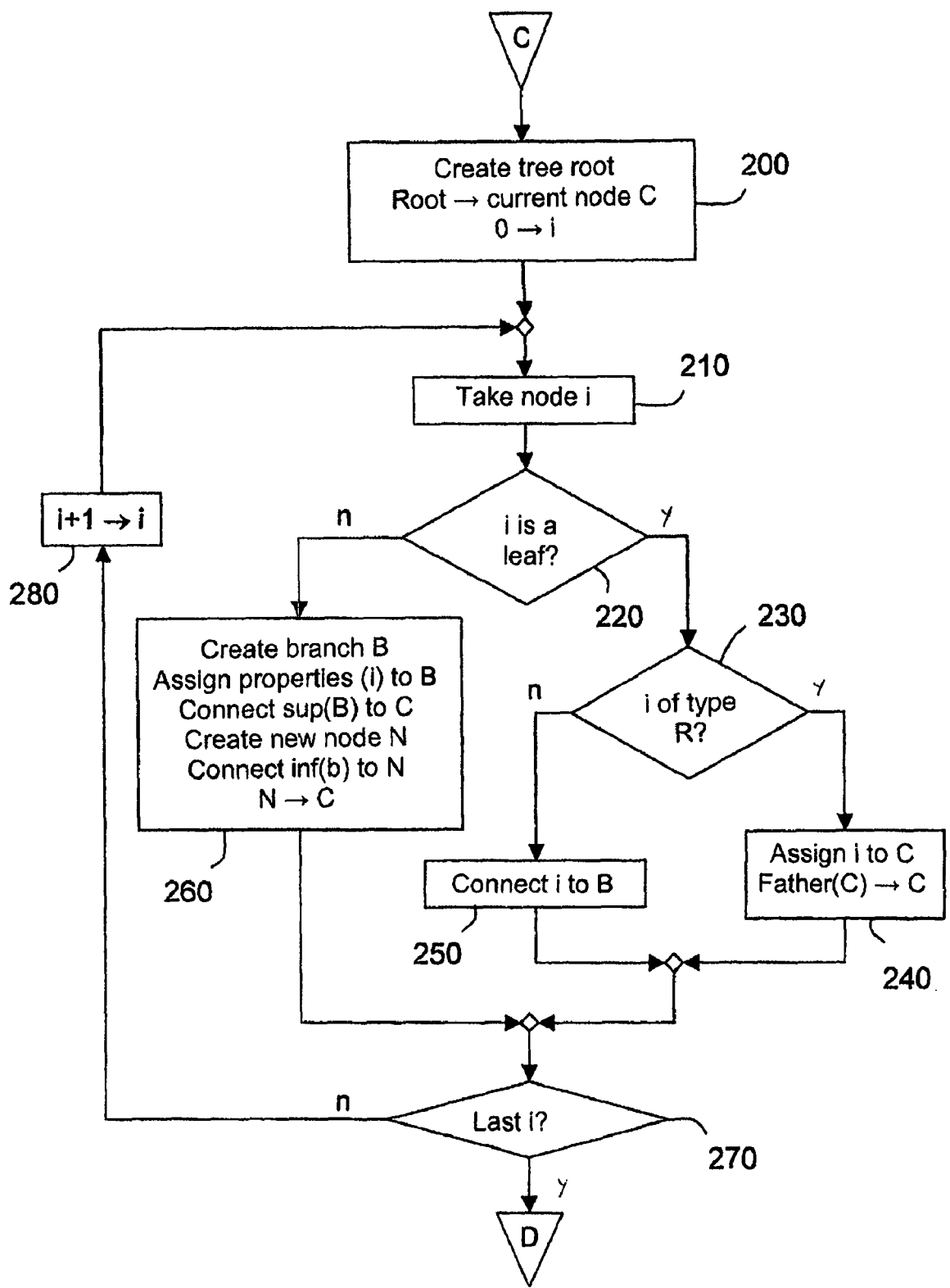

Reference will now be made to FIG. 4 to describe the principal stages of an example of an algorithm for constructing a structural n-ary tree. This algorithm is executed by the n-ary tree controller GAN of the device D according to the invention.

It is important to note that in the example shown in FIG. 1, the n-ary tree controller GAN is supplied with binary trees by the binary tree controller GAB of the device D. However, this is not necessarily the case. In fact, it is possible for the n-ary tree controller GAN to be supplied with binary trees by external equipment, or it may be arranged so as to construct an n-ary tree directly from an ordered series of verbal entities, hence without the need to construct a binary tree beforehand.

At C, the n-ary tree controller GAN receives the description of a binary tree, supplied for example by the algorithm for constructing the structural binary tree as described above. In a step 200, the n-ary tree controller GAN proceeds to initialise the structural n-ary tree which is to be constructed. It creates a first node C (current) in the n-ary tree which becomes its root node and resets to zero a counter of index i of the node of the associated binary tree.

It is important to note that each node of an n-ary tree is associated with a single verbal entity (or word) coming from a leaf of the binary tree, unlike the binary tree which comprises intermediate nodes associated with a number of verbal entities (or words).

In a step 210 the n-ary tree controller GAN takes a node of index i from the binary tree, then in a step 220 it runs a test to determine whether this node of index i is a leaf of the binary tree.

If this is the case, the n-ary tree controller GAN runs a test in a step 230 to determine whether the node of index i is of the governing type (R) or subordinate type (S).

If the node of index i is governing (R), then in a step 240 the n-ary tree controller GAN associates, with the current node C, the leaf node of index i of the binary tree, and this current node C is then regarded as the father of at least one son node of the n-ary tree. In fact it will be recalled that, systematically corresponding to each father node of a binary tree, there is a governing son node and a subordinate son node. Consequently, the two son leaf nodes of each intermediate father node of a binary tree may be linked to one another to form, within the associated n-ary tree, a structure in which the governing son node is attached to the corresponding subordinate son node by a link which may be associated with connectional characteristics of their father node. Because of this type of attachment between leaf nodes of the binary tree, within the associated n-ary tree, the root node of the n-ary tree can only be a governing leaf node which is attached, directly and indirectly, to the root node of the associated binary tree by one or more intermediate nodes exclusively of the governing type. In other words, this root node comes from an exclusively governing line.

After this step 240, the n-ary tree controller GAN moves on to a step 270.

On the other hand, if the node of index i is not of the governing type (R), it is therefore of the subordinate type (S). Consequently, it must be attached by a link (or branch B) to the governing node (R) which is attached to its own father node within the binary tree. In a step 250 the n-ary tree controller GAN therefore connects (attaches) the subordinate node (S) of index i to the corresponding governing node (R), by means of a link associated with connectional characteristics of their father node. Then, the n-ary tree controller GAN moves on to step 270.

If the results of the test carried out in step 220 indicate that the node of index i is not a leaf of the binary tree, it must therefore be one of its intermediate nodes. Consequently, in a step 250, the n-ary tree controller GAN starts by creating a new branch in the n-ary tree under construction, then it assigns the properties of the node of index i to this branch B. Next, it connects (or attaches) the upper end (sup(B)) of the branch B to the current node C and creates a new node N which it connects (or attaches) to the lower end (inf(B)) of the branch B. Finally, the n-ary tree controller GAN replaces the current node C by the node N which it has just created, before passing on to step 270.

In step 270 the n-ary tree controller GAN runs a test to determine whether the node of index i being processed is the last node of the binary tree to be processed. If this is the case, then the structural n-ary tree is constructed and the construction algorithm for the n-ary tree ends at D. On the other hand, if the node of index i being processed is not the last node of the binary tree to be processed, in a step 280 the n-ary tree controller GAN increases, by one unit, the value of the index i, then it goes back to carry out step 210 with the next node of the binary tree. The nodes of the binary tree are thus all processed one after the other starting from the root node.

Figure 8:
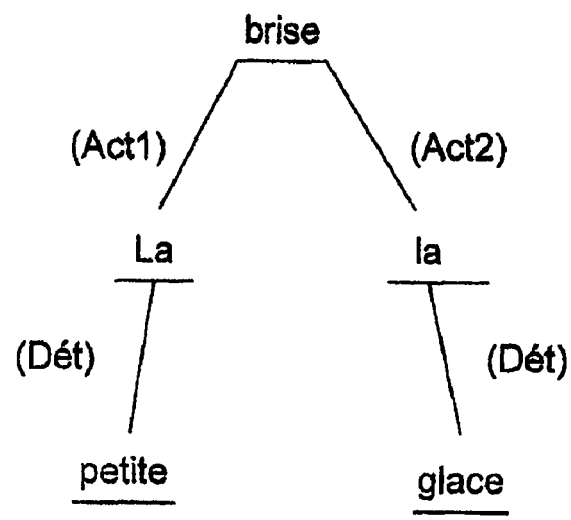

An example of a structural n-ary tree arising from the structural binary tree in FIG. 7 (which corresponds to the sentence "La petite brise la glace") is illustrated in FIG. 8.

In this example, as shown in FIG. 7, the root node of the n-ary tree is the verb "brise" which is the only governing leaf node of the binary tree that originates from an exclusively governing line. In most cases the root node of the n-ary tree is the main verb of the sentence being analysed.

Two structures of two associated son nodes are attached to the root node "brise".

A first structure is made up of the nodes "La" and "petite" which are respectively the governing and subordinate leaf nodes of the intermediate node associated with the verbal entities "La petite" in the binary tree. The leaf node "La" being governing in this case, it is therefore attached to the root node "brise". The leaf node "petite" is subordinate in this case and attached to the associated governing node "La" by a link associated with connectional characteristics of their father node ("La petite") within the binary tree.

A second structure is made up of the nodes "la" and "glace" which are, respectively, subordinate and governing leaf nodes of the intermediate node associated with the verbal entities "la glace" in the binary tree. The leaf node "glace" being governing in this case, it is therefore attached to the root node "brise". The leaf node "la" is subordinate here and attached to the associated governing node "glace" by a link associated with connectional characteristics of their father node ("la glace") within the binary tree.

Once an n-ary tree has been constructed the analysis of the meaning of an ordered series of verbal entities continues by constructing a semantic tree for each sentence in the document. By "semantic tree" is meant here a tree which contains only categorising entities (of the object or activity type) provided with their properties, necessary for understanding the meaning of the sentence (or document), taking account of its context.

The categorising entities constitute the first level of breakdown of taxonomy: ontology. All the categorising entities are in one or other of their sub-types (or sub-classes).

Figure 5:
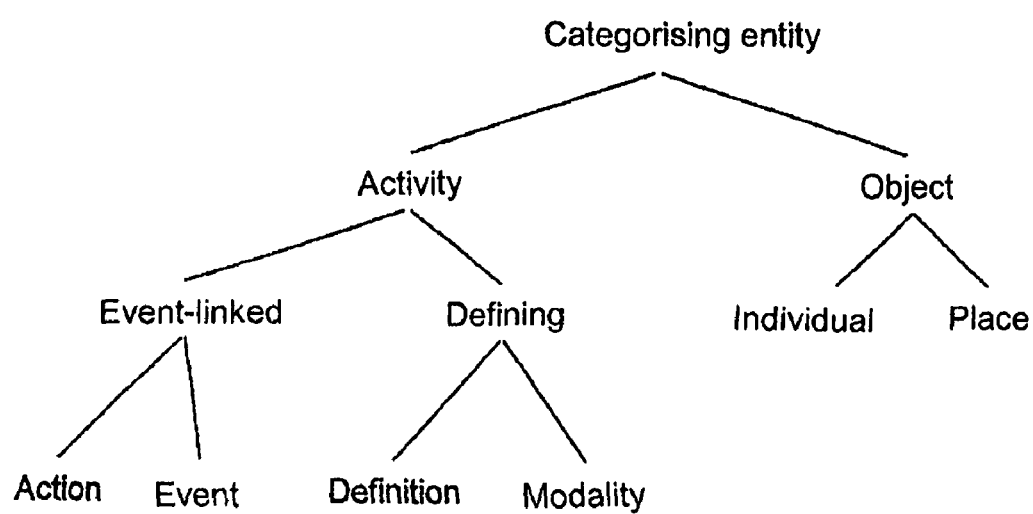
FIG. 5 is a non-restrictive tree diagram schematically showing the relations between different types, sub-types and sub-sub-types of categorising entities, FIG. 6 schematically shows the main steps of an example of an algorithm for constructing a semantic tree from a structural n-ary tree, FIG. 7 schematically shows an example of a structural binary tree, FIG. 8 schematically shows an example of a structural n-ary tree resulting from the structural binary tree in FIG. 7, FIG. 9 schematically shows an example of a semantic tree resulting from the structural n-ary tree in FIG. 8, FIG. 10 schematically shows the causal and anaphoric relations in another example of a semantic tree, FIGS. 11A and 11B, respectively, schematically illustrate another example of a structural n-ary tree and the associated semantic tree in the case of chronological management, FIG. 12 schematically shows a temporal relation between two examples of semantic trees, FIG. 13 schematically shows the temporal and anaphoric relations between two other examples of semantic trees, FIG. 14 schematically shows semantic compatibility relations between the verbal entities of another example of a semantic tree, FIG. 15 schematically shows the principal relations between nodes associated with nouns (NO) and nodes associated with adjectives (NA), and the main ideas attached to them (particularly metrics), and FIG. 16 schematically shows the main relations between categorising entities of the object and activity type and the main ideas attached to them.

FIG. 5 shows a non-restrictive example of a tree diagram describing different types, sub-types and sub-sub-types of categorising entities. More precisely, in this example, the categorising entities of the "activity" type combine two sub-types (or sub-classes) of categorising entities referred to as "event-linked" and "defining" which respectively combine two sub-sub-types (or sub-sub-classes) of categorising entities known as "action" and "event" on the one hand and "definition" and "modality" on the other hand. The categorising entities of the "object" type combine two sub-types (or sub-classes) of categorising entities referred to as "individual" and "place".

It is important to note that the quality of lexicons depends to a large extent on the quality of the ontology. Moreover, ontologies may be constructed automatically.

Figure 6:
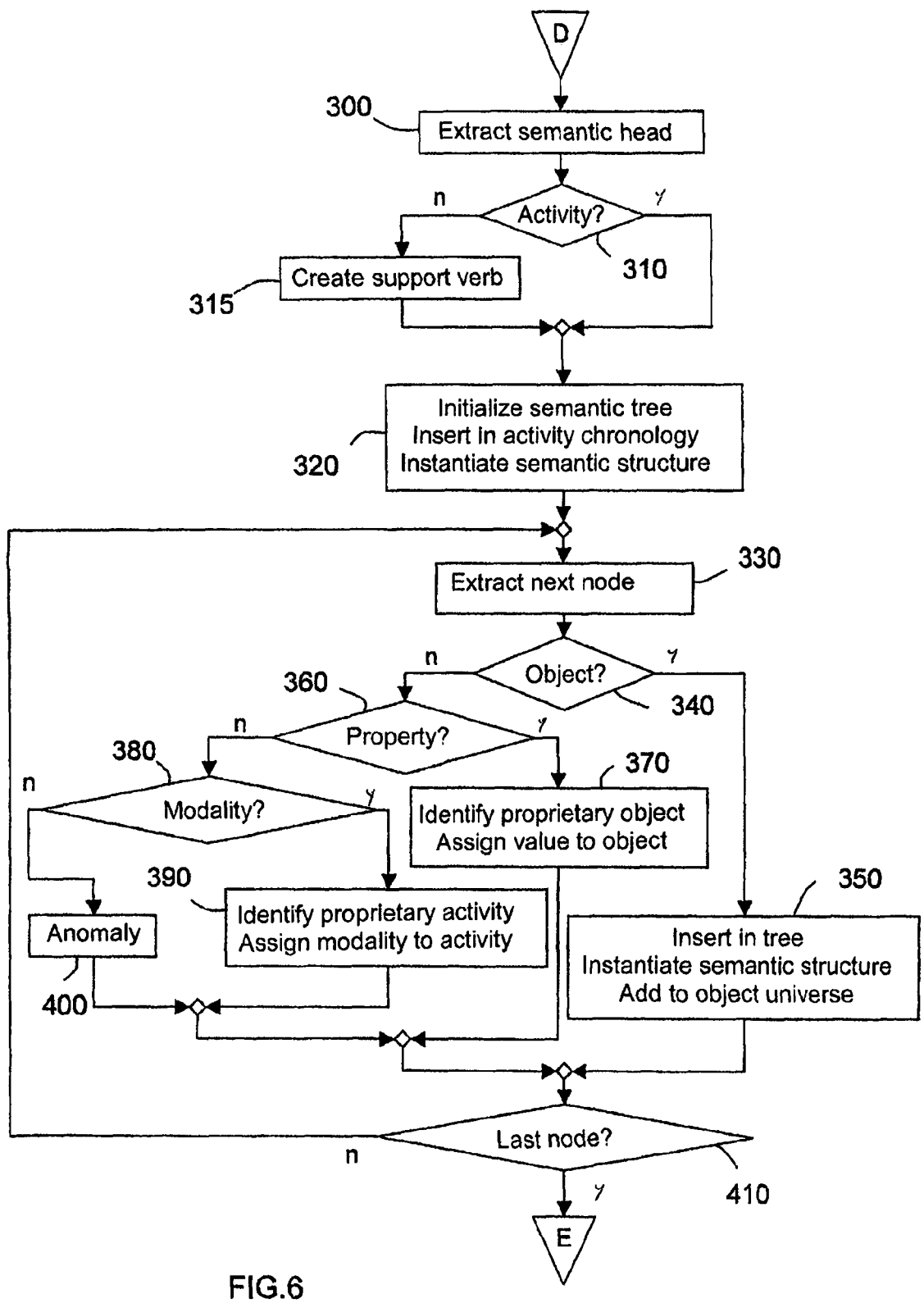

Reference will be made to FIG. 6 to describe the main stages of an example of an algorithm for constructing a semantic tree. This algorithm is implemented by the semantic tree controller GAS of the device D according to the invention. It may be preceded by the possible application of a lexical function intended to standardise the structural n-ary tree so as to eliminate any "stylistic" peculiarities likely to interfere with its semantic analysis.

At D, the semantic tree controller GAS receives the description of an n-ary tree, supplied for example by the algorithm for constructing the structural n-ary tree described hereinbefore. In a step 300, the semantic tree controller GAS extracts from the structural n-ary tree the verbal entity subtended by a highest categorising entity placed in the n-ary tree (generally associated with its root node) which constitutes the root of the semantic tree.

Then, in a step 310, the semantic tree controller GAS runs a test to determine whether the verbal entity corresponds to an activity.

If the verbal entity corresponds to an activity, the semantic tree controller GAS moves on to a step 320. If this is not the case, the semantic tree controller GAS creates, in a step 315, a support verb defining an activity, then it moves on to step 320.

In step 320 the semantic tree controller GAS initialises the semantic tree. Then it inserts the activity in a chronological list of activities which may optionally already contain other activities itemised in the sentence being analysed and/or in previous sentences in the document which is being analysed. This list may for example take the form of a table constructed as it goes along and stored in a memory. Then, the semantic tree controller GAS instantiates a semantic structure. In other words, the lexicon supplies a pattern of a semantic tree for the categorising entity (object) the "boxes" of which will be filled using information supplied by the other nodes of the structural tree.

A pattern comprises, on the one hand, a semantic connecting model (of the same kind as certain lexical functions) which enables the agent diagram of a verbal entity to be converted into a semantic (sub)tree, as shown schematically by way of example in FIGS. 8 and 9, and on the other hand a list of properties (or attributes), as shown schematically in FIG. 9.

Then, in a step 330, the semantic tree controller GAS extracts the following node from the n-ary tree and in a step 340 it runs a test to determine whether the verbal entity associated with this extracted node activates an object. In accordance with the definition given previously, the word "object" should be understood here as having the broadest and most current definition, extending to include abstract objects such as feelings and representations, and not the specialist restrictive definition which it has in computer science.

If the verbal entity activates an object, then in a step 350 the semantic tree controller GAS inserts this object into the semantic tree. Then it inserts the object into a list (or universe) of objects which may optionally already contain other objects itemised in the sentence under analysis and/or in previous sentences of the document under analysis. This list takes the form, for example, of a table constructed as it goes along and stored in a memory. Then, the semantic tree controller GAS instantiates the semantic structure (as indicated above). The semantic tree controller GAS then moves on to step 410.

If the results of the test carried out in step 340 indicate that the verbal entity is not an object, then in a step 360 the semantic tree controller GAS runs a new test to determine whether properties (or connectional characteristics) are associated with this verbal entity.

If this is the case, in a step 370 the semantic tree controller GAS identifies a proprietary object. More precisely, a categorising entity of the "property" type which has no autonomous function (other than making it a meta-object) and which necessarily characterises an object, has been identified. This object, which is "proprietary", is identified either directly through a connection (ordinary or anaphoric) that links it to the property (such as for example the expression "the colour of the sky" or "its colour"), or (more rarely, when there does not appear to be any apparent connection) by running through the list of objects instantiated by the text analysed in search of an object which has the property in question (which may be a source of anomalies if no such object exists or if there are several possibilities).

Then, the semantic tree controller GAS assigns a value to the object. The value or values associated with the property is or are identified directly by searching among the subordinate nodes for those that are adjectivally connected (such as for example the expression "blue in colour") even if it means assigning a value "not known" (or NC) when this type of connection does not exist, either directly because it is carried by the verbal entity which activates the property (for example the word "beauty" authoritatively assigns a positive value to a property which will arbitrarily be referred to here as "aesthetic"), or indirectly when the governing verb is a defining verb (as for example in the case of the expression "its colour is red" or "increase the volume by 100 Mo").

The semantic tree controller GAS then moves on to step 410.

If the results of the test carried out in step 360 indicate that the verbal entity is not associated with a property, then in a step 380 the semantic tree controller GAS runs a new test to determine whether modalisation is possible. Modalisation is carried by verbs such as "to be able" or "to want", on the one hand, and "to think (that)" or "to believe (that)", on the other hand. These verbs do not activate activities (unlike the verbs to think or to believe when they are used absolutely) but modify the interpretation of the activity to which they are attached. Thus the expression "I can go there" does not have the same value as the expression "I'm going there", but in both cases the semantic head is the verb "to go". Similarly, the expression "Pierre thinks that we do not write enough" does not have the same value as the expression "we do not write enough", the semantic head being the verb "to write" in both cases.

If modalisation is possible the semantic tree controller GAS identifies a proprietary activity in a step 390. The procedure of identifying a proprietary activity is similar to that of a proprietary object described above (but applied to an activity).

Then, the semantic tree controller GAS assigns a modalisation to the proprietary activity. The semantic tree controller GAS then moves on to step 410.

If the results of the tests carried out in step 390 indicate that there is no modalisation, then in a step 400 the semantic tree controller GAS judges that an anomaly is present. A node is then present which cannot be attached to the semantic tree under construction.

The semantic tree controller GAS then moves to step 410.

In step 410 the semantic tree controller GAS runs a test to determine whether the node of the n-ary tree which has just been analysed is the last of said n-ary tree. If this is the case, the semantic tree is constructed and the algorithm for constructing the semantic tree ends at E. On the other hand, if the node of the n-ary tree which has just been analysed is not the last of said n-ary tree, the semantic tree controller GAS goes back to step 330 in order to start to analyse the next node of the n-ary tree. All the nodes of the n-ary tree are thus analysed one after another.

An example of a semantic tree originating from the structural n-ary tree in FIG. 8 (corresponding to the sentence "La petite brise la glace") is illustrated in FIG. 9.

In this example, the root node of the semantic tree is the verb "briser" coming from the word "brise" of the n-ary tree in FIG. 8. This word "brise" actually has two very different meanings in French: the verb "briser" in the present tense (and hence an activity corresponding to the answer "now" to the question "when?", seeing that it remains to be seen whether the word "now" relates to the time of the speech or whether it is defined by the speech), and the noun "brise" which refers to a slight cool wind.

Analysis of the context of the sentence "La petite brise la glace" indicates for example that the word "brise" is the verb "briser". In another interpretation of this example of a sentence, the verb could be the word "glace", the subject of this verb could be the word "brise", the adjective attached to the subject "brise" the word "petite" and the direct object complement could be the word "la" acting as an anaphoric pronoun.

If the main verb used is "briser", associated with the temporal property that describes its time (in this case the present time—"now"), there is some uncertainty as to its subject and complement. In fact, in FIG. 8, the word "brise" is attached to two structures "La—petite" and "la—glace". There may therefore be a first connection (Act1) consisting of "La petite briser" and a second connection (Act2) consisting of "briser la glace". The first connection is referred to as the "prime agent" (or subject) whereas the second connection is referred to as the "second agent" (or object).

Here, it is apparent from the construction of the sentence that the word "glace" is a direct object complementing the verb "briser" because it answers the question "what?" asked of the subject of this verb. The noun "glace" is therefore a principal node of the object type attached to the verb "to briser" which is a principal node of the activity type.

Moreover, the word "petite" is an adjective attached by virtue of its position to a subject of the verb "briser", who is represented here by the word "La" which is therefore an anaphoric pronoun denoting a common feminine name introduced in a previous sentence. "La" is in this case a determinant the role of which is on the one hand to confirm the noun status of the verbal entity that accompanies it (thus making it possible to turn adjectives or verbs, for example, into nouns) and on the other hand to provide information as to the existence of the associated object.

The adjective "petite" thus constitutes a principal node of the object type (referenced x in FIG. 9) because it answers the question "who?". This object node x is associated with two properties, one of feminine gender (referenced F in FIG. 9) and one of size (referenced small in FIG. 9).

The semantic tree shown in FIG. 9 is therefore the result of resolving the ambiguity relating to two branches attached to the word "brise" in FIG. 8.

However, this semantic tree cannot resolve the other ambiguity relating to the interpretation of the sentence as described above. In order to attempt to resolve this other ambiguity, additional analyses of a contextual type have to be carried out by the semantic analyser AS of the device D. In the sentence given by way of example, this other ambiguity can only be resolved by cotextual analysis relative to the previous and/or following sentences in the document analysed, or contextual analysis (i.e. of a pragmatic nature). A distinction is made here between the notion of "cotext" which denotes the text surrounding a sentence being analysed, and the notion of "context" which refers to the environment (in the broad sense) in which a text is produced and/or received.

These complementary analyses consist more precisely in attempting to determine relations between words belonging to sentences in the same document, placed in the list of activities and/or in the universe of the objects. These relations may be of several kinds, notably spatial, temporal, anaphoric or causal.

These complementary analyses are intended essentially to process anaphors and cataphors. They are carried out by determining within the tables (or lists) of objects and activities the words which have no semantic identity, such as pronouns, for example. In other words, a search is made among the stored words for those which may act as anaphoremes.

It is important to note that the objects and activities are organised in semantic classes in ontologies to which metrics and reference systems (spatial, temporal, etc.) are assigned. This allows functions of semantic compatibility of the RCS1, RCS2 type to be applied. The RCS type functions constrain the construction of a structural tree.

Some examples of complementary analyses which can resolve ambiguities are described hereinafter.

FIG. 10 shows two semantic trees corresponding to two parts of a sentence separated by the separator ":". This sentence is "Le client a appelé: il a reçu sa facture en retard" ["The customer called: he received his bill late"].

The semantic tree on the left corresponds to the part of the sentence "Le client a appelé". The principle nodes of this semantic tree are "appeler" and "client". The word "appeler" is the principal verb and hence the activity, whereas the word "client" is a noun which is the subject of the verb "appeler" and hence an object.

The semantic tree on the right corresponds to the part of the sentence "il a reçu sa facture en retard". The principal nodes of this semantic tree are "recevoir", "il" and "facture". The word "recevoir" is the main verb and hence the activity, while the word "il" is a pronoun, the subject of the verb "recevoir" and hence an object, and the word "facture" is a noun which is the direct object complement of the verb "recevoir" and hence an object.

The separator ":" is equivalent here to "because", so that there is a causal relation between the two parts of the sentence.

The anaphoric "il" can only refer to the word "client". In fact, in the list of objects instantiated in the analysed document, only the word "client" meets the conditions of structural and semantic compatibility (masculine singular noun, semantically compatible with the prime agent (or subject) of the verb "recevoir", which is the word "il"). There is therefore an anaphoric relation between the words "client" and "il".

From these two causal and anaphoric relations it is possible to deduce that the customer called (at time t) because he received a bill at a moment t' ($t'=t_F+\delta tR>t$, where $t_F$ is the date of billing and $\delta tR$ is the time taken to create the bill and send it). It is thus possible to represent the resolution of ambiguity by assigning to the verb "appeler" a property relating to time ($t<t_D$) where $t_D$ denotes the time of the speech, and assigning to the verb "recevoir" a property which also relates to time ($t>t_F+\delta tR$).

It is important to note that an ambiguity linked to a cataphor is treated in the same way as an anaphor provided that the list of objects instantiated has been drawn up in full for the entire document.

FIGS. 11A and 11B show a structural n-ary tree and the associated semantic tree which correspond to the sentence "La facture est arrivé après la date d'échéance" ["The bill arrived after the due date"].

In order to make use of the meaning of this sentence, for example in an information-filtering application, an attempt is made to identify one (or more) typical activities which are chronologically compatible. The idea of "delay" (in receiving the bill) is an evaluation relating to respecting the theoretical date of performing the activity observed, comparing it with the actual date.

The ambiguities are materialised here in the structural n-ary tree by stylised Ts placed level with the words "après" and "échéance" and materialising a function of translation of the word on the right by the word on the left. The word on the left of a stylised T must be a translative; this is a grammatical word which has the ability to change the structural category of the word to the right of the same stylised T. For example, in the expression "I'll take the red" (referring to a garment), the determinant "the" changes "red" from its original category of an adjective to being a noun, the implication being that at a semantic level there must be an object compatible with the colour red which answers the question posed.

Figure 12:
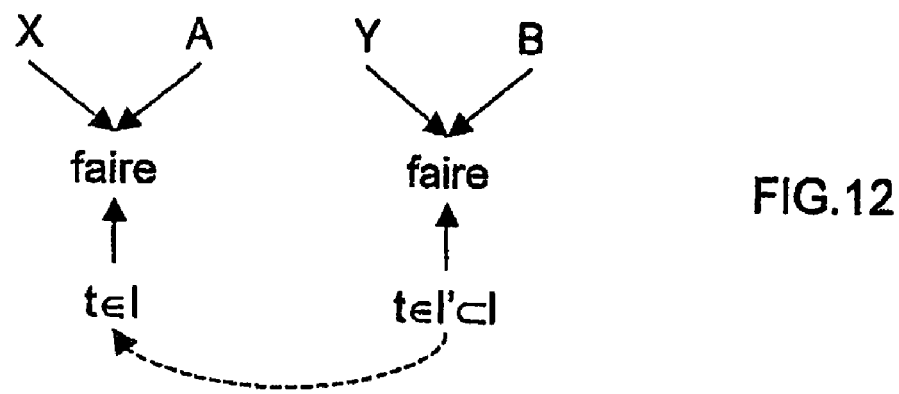

FIG. 12 shows two semantic trees corresponding to two parts of a sentence separated by the separator "," (comma). This sentence is "Pendant que X fait A, Y fait B" ["While X does A, Y does B"]. This example materialises the temporal relation between the two actions carried out by X and Y, respectively.

More precisely, analysis of the two semantic trees and of the tables of deed and objects associated with the document being analysed makes it possible to understand that action A takes place in a time interval I and that action B takes place in a time interval I' which is included in I.

Figure 13:
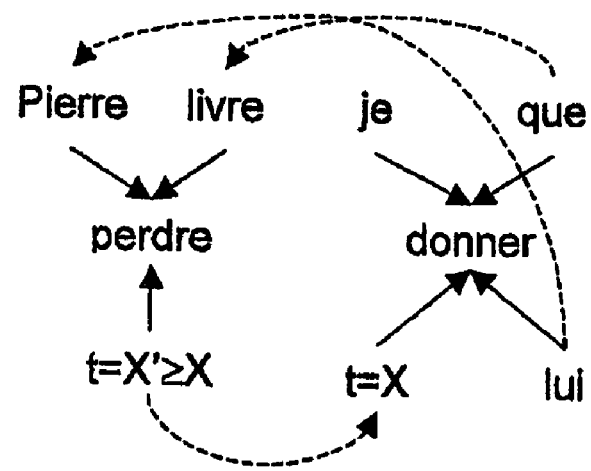

FIG. 13 shows two semantic trees corresponding to two parts of the same sentence. This sentence is "Pierre a perdu la livre que je lui avais donné" ["Pierre has lost the book that I had given him"]. This example materialises, on the one hand, the temporal relation between the two actions ("donner un livre" ["give a book"] and "perdre le livre" ["lose the book"]), and on the other hand the anaphoric relation between the words "Pierre" and "lui" ["him"] and the words "livre" ["book"] and "que" ["that"].

More precisely, analysis of the two semantic trees and of the tables of activities and objects associated with the document being analysed shows that the word "lui" can only refer to the word "Pierre", and that the word "que" can only refer to the word "livre". Then, it is deduced from the respective times associated with the two verbs and the two anaphoric relations that the action "donner un livre" took place at a moment t=X and the action "perdre le livre" took place at a moment t=X'≧X.

Apart from exceptions which constitute an anomaly (detected in step 400 in FIG. 6), a principal node belonging to a semantic tree can only be an activity or an object originating from the structural classes of verb and noun. However, in some very particular cases, certain nodes of a structural n-ary tree may not respond to this constraint. This is the case in particular with the word "red" in the sentence "I'll take the red".

As the word "red" is an adjective in this case, it cannot directly create a principal node in the semantic tree. It can only be in principle a value of a property (the colour) of a noun object to which it relates. Complementary analysis, parallel to that which resolves the anaphors and cataphors, therefore has to be carried out. This complementary analysis consists in determining the objects, already itemised in the list of objects of the document which is to be analysed, which have or has a property of the same type as that associated with the word causing the problem. In the example in question, this property is the colour. Then, the objects determined in the list are subjected to the semantic constraints carried by the main verb, in this case the verb "to take". The value "red" is then assigned to the property "colour" of the compatible object, which then constitutes a node that is allowed to be integrated in the semantic tree of the sentence to which it belongs.

Figure 14:
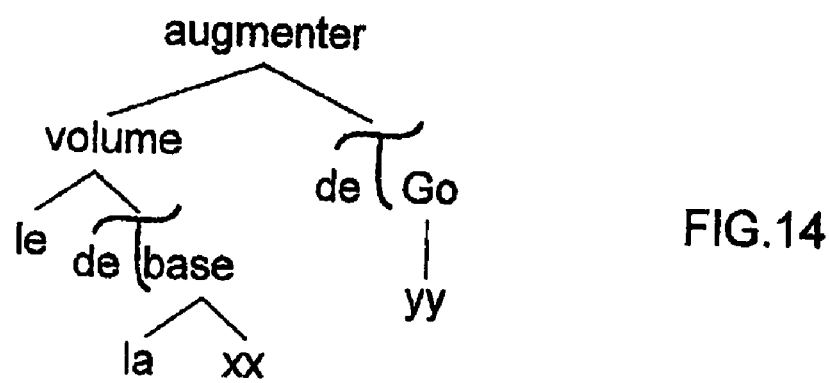

The problem of semantic compatibility mentioned above will now be described in more detail with reference to FIGS. 14 to 16.

FIG. 13 shows an n-ary tree corresponding to the sentence "Augmenter le volume de la base xx de yy Go" ["Increase the volume of the base xx by yy Go"}. The ambiguities are materialised here in the structural n-ary tree by stylised Ts placed level with the words "base" and "Go" (standing for "Giga octet").

A first semantic pre-analysis shows that the semantically pertinent words, i.e. those which arise from the environment modelled, are here "augmenter", "volume", "base", "xx", "Go" and "yy".

If in doubt, unknown words such as "xx" or "yy" are preferably retained during the semantic filtering of the document being analysed.

The semantic compatibility relations are governed for example by two types of compatibility rules known as $C_1^x$ and $C_2$.

The type $C_1^x$ compatibility rules apply to two nodes which are directly connected, i.e. wherein the connection (or attachment) does not comprise an intermediate node. This is the case for example with the words "augmenter" and "volume". The connection may however include translatives (stylised Ts) such as in the case of the words "volume" and "base", for example.

These type $C_1^x$ compatibility rules are divided into two groups.

A first group relates to compatibility based on agent/semantic diagrams which the language allows to be degraded by replacing an object node (NO) such as a noun with another object node compatible with the first one within the framework of metrics.

An agent diagram (or connection potential) describes all the connections (hence the phrase "connection potential") which a verbal entity is liable to accept, and conditions for their realisation. Each potential connection is identified by a connectional characteristic, such as for example those designated Act1, Act2 and Det in FIG. 8). Moreover, each potential connection comprises a variable number of structural and/or semantic constraints (for example, the potential connection Act1 of a verb can only be provided by a noun which is compatible in number, in gender and semantically).

A second group relates to compatibility based on metrics, which preferentially constrains the connection of a node associated with a noun (NO) to a node associated with an adjective (NA), including nodes associated with true nouns (designated $NO^O$) and the other nodes associated with noun units (designated $NO^U$).

The type $C_2$ compatibility rules apply to two nodes connected indirectly, i.e. wherein the connection (or attachment) passes through at least one other node. This is the case for example with the words "volume" and "Go."

These type $C_2$ compatibility rules are based on the parameters which are involved in the subsequent interpretation made of the document being analysed. These rules are part of the semantic tree pattern described hereinbefore in the description of step 320 in FIG. 6.

The idea of metrics arises during the complementary analysis of the semantic compatibility relations between a noun and an adjective subordinate to it, whether this adjective is subordinate from the outset or by translation (stylised Ts).

A metric is defined by the set of values which it allows associated with a unit (and the multiples and subdivisions thereof).

If one looks at a connection NO-NA wherein on the one hand NA belongs to one or more metrics, it is possible to draw up a list $P_A$ of all the properties (irrespective of the objects which they define) with which these metrics may be associated, and on the other hand NO is defined by a set of properties $P_O$, each linked to a metric. Thus, several cases may arise:

card $(P_A \cap P_O)=0$ and there is an incompatibility between the noun (NO) and its adjective (NA), or card $(P_A \cap P_O)=1$, and the value which the adjective (NA) constitutes is assigned to the property of the noun which is the only element of the intersection, or card $(P_A \cap P_O) > 1$, and there is an ambiguity, because, as the intersection of the two sets contains a number of elements, it is not known to which property of the noun the value that the adjective constitutes should be assigned.

There are two types of metrics: quantitative and qualitative.

The quantitative metrics are generally described in terms of intension, as a subassembly that satisfies a condition, such as for example belonging to the set of positive integers or decimals. Qualitative metrics are generally described in terms of extension in the form of a set of discrete values, such as for example colour (red, green, yellow, blue, orange, etc.) or beauty (beautiful, ugly, etc.).

The quantitative metrics are also distinguished from the qualitative metrics because they allow a relation of order (the values can be classified, which is not the case with purely qualitative metrics) and they generally involve the notion of unity (except where counting is involved).

A particular status should be provided for units and percentages. In fact, units respond to the problems of counting (creating a category of absolute), while percentages make it possible to create relative scales which are independent of any unit.

For example, an exact quantitative metric may correspond to a scale of intensity between −25 and +25, and an approximate quantitative metric may be defined by discrete values of adjectives such as large, medium and small.

An example of the use of metrics is given hereinafter in the case of the sentence "Create an empty base; its volume will be 3 Go".

The word "create" (action) is compatible with the word "base" (object) which is a true noun ($NO^O$) defined by properties such as identifier, volume, content, server, etc.

The word "empty" is an adjective (NA) which is governed by the word "base" and which must therefore be assigned as a value to one of the properties of the word "base" ($NO^O$). Of the above-mentioned properties, only the properties of identifier and content have a compatible metric. The property identifier has the particular feature of having no precise metric, as any word, existing or made up, can be used. It follows that it is strongly recommended not to use words in current use as identifiers, thus providing a first index to resolve the previous ambiguity. An unknown word judiciously placed in a structural tree is a properly designated candidate. A second index is provided by the absence of a capital letter.

It results from the foregoing that the word "empty" can only be assigned to the property of content.

The analysis can be completed by relating the word "empty" to a number. In fact, the metric associated with the property of content comprises—at least—{empty, full}∪[0, 100] . . . .

Moreover, the words "will be" is a [complementary] information verb, the word "volume" is a property, given that the word "its" relates to an object defined elsewhere (anaphoric connection), the word "Go" originates from the very special category of units which are necessarily associated with a quantitative metric, and the word "3" is an adjective (NA) of the number type which is capable of belonging to all the quantitative metrics compatible with positive integers.

The word "3" may therefore be assigned as a value to the word "volume" provided that the intersection $M_{volume} \cap M_{Go} \cap M_3$ (wherein $M_x$ denotes the set of all the metrics that can be associated with x) contains one element and one alone. In the opposite case there is either an impossibility if the intersection is empty or an ambiguity if there are a number of solutions.

When there is incompatibility between a noun group (or syntagma) (SO) and an adjectival group (or syntagma) a priori, the metrics can supply information. This is true for example of the sentence "I wish to top up my mobile by two hours".

In this example there is actually an incompatibility a priori between the word "top up", which calls up a node associated with a noun that carries the value of the associated adjective ($NO^A$) (and hence constitutes a property), and the word "mobile", which is a node associated with a true noun ($NO^O$) (and hence constitutes an object). On the other hand, in the set of properties (P) of the word "mobile" there are some which are compatible with the word "top up". For example the word "duration" is a noun ($NO^A$) which carries the value of the adjective associated with the word "fixed", which is itself a property of the word "mobile", also compatible with the timetable metric.

Other situations give rise to ambiguities. This is the case, for example, when a verbal group (or syntagma) (SI) and a true noun $NO^O$ are connected: "turn up the music", "turn down the music", or "measure the table". To resolve this type of ambiguity a function is used which, when an incompatibility appears during the verification of a direct compatibility, reruns a compatibility test between the verb and the properties of the node of the agent concerned. Here, the agent is regarded as a node which is the object of a direct connection with a verb, which is itemised in the pattern (or agent diagram) of the latter.

Figure 15:
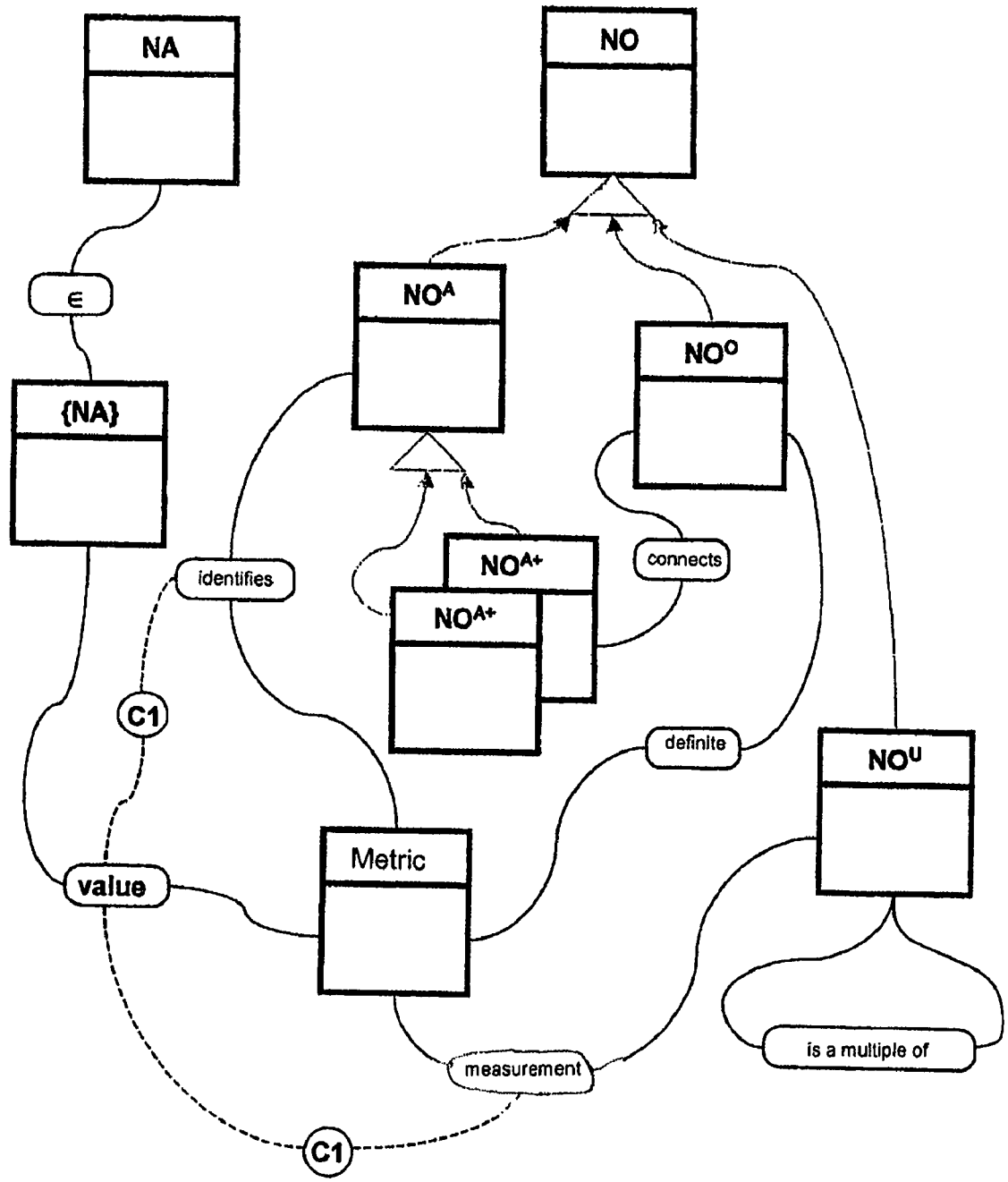

FIG. 15 schematically shows (and summarises) the principal relations between nodes associated with nouns (NO) and nodes associated with adjectives (NA), and the ideas attached to then, notably the metrics, units and constraints (or rules) C1 which prohibit all the triplets (identifier, valuation, measurement) that are not valid.

Figure 16:
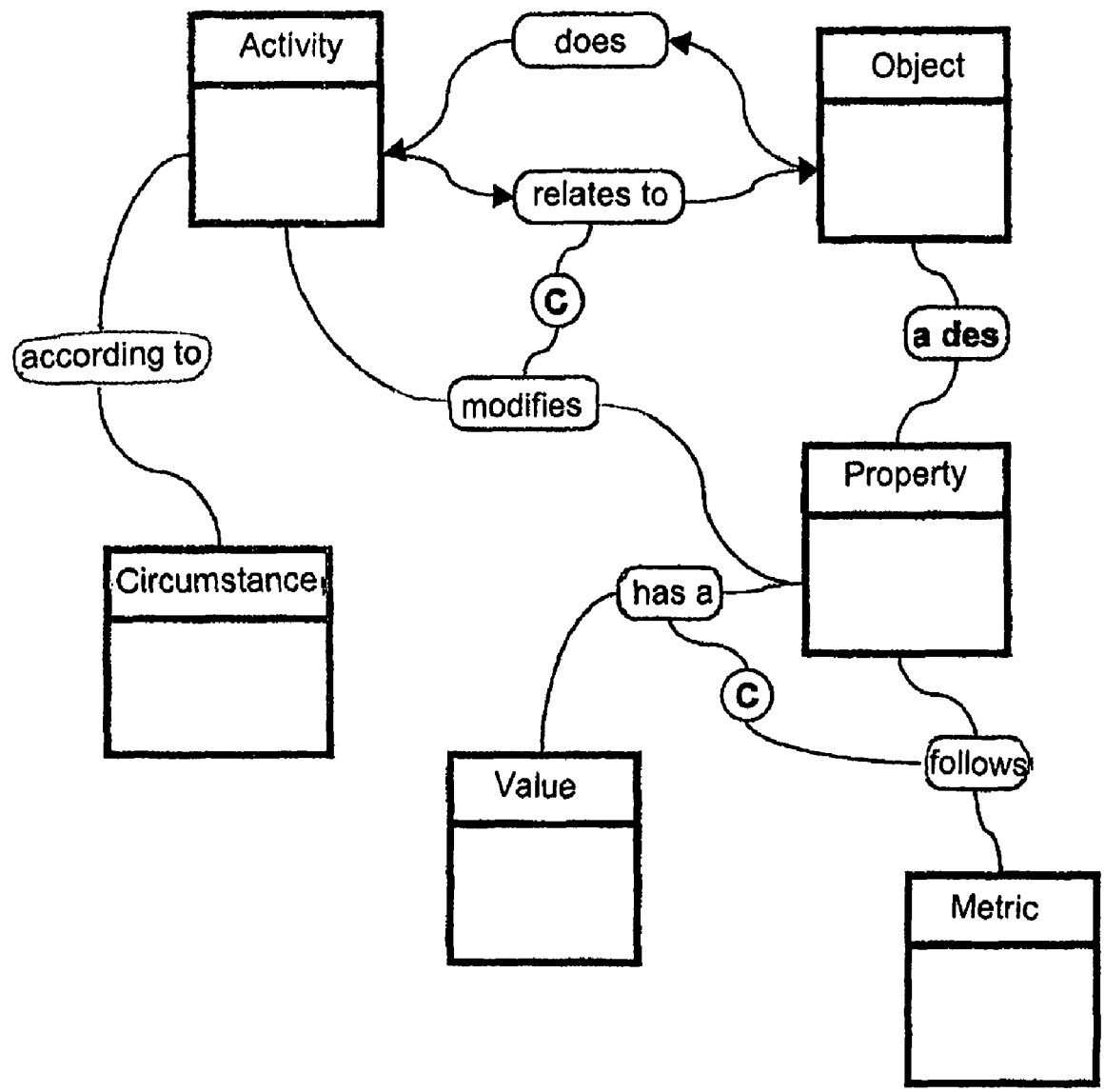

Moreover, FIG. 16 schematically shows (and summarises) the principal relations between the categorising entities of the object and activity type and the ideas attached to them, notably the circumstances, modalities, properties, values and metrics.

The device D for semantic document analysis according to the invention, and particularly its document interpreter ID and database BD, and possibly its breakdown module MD, may be made in the form of electronic circuits, software (or data processing) modules or a combination of circuits and software.

Moreover, the device D for semantic document analysis can be used in any application that requires reliable separation of correctly analysed texts or messages from those which are not, and a precise diagnosis which is easy to use for texts or messages which have been incorrectly analysed.

A first application relates to tools (or equipment) for managing electronic messaging, for example of the e-mail type). The device D can in fact act as a filter for information by determining whether the message that contains this information satisfies a set of semantic criteria.

To this end, it is possible for example to organise the semantic criteria into a reference supergroup defining a filter. The supergroup resulting from the analysis of the message is then compared with the reference supergroup that defines the filter. The message analysed is accepted if the two supergroups are compatible.

If the message supplies supernumerary information, the device D will continue to react positively through its filter, which is of no importance provided that the filter supplies at least the information required by the reference supergroup.

The reference supergroups may be created from the synthesis of the results of the analysis of a body of reference messages, thus saving the user tasked with designing the filters from having to acquire knowledge specific to the application; in fact it is sufficient if he has an adequate mastery of plain language to work on the body in question.

It is also possible to juxtapose a number of filters within a single device D or parallel devices D and to couple this or these device(s) to an interface adapted for routing, so as to form an electronic mail manager.

A second application relates to the tools (or equipment) of correcting spelling and/or grammar. The device D may, in fact, be used on the one hand to flag up the grammatical errors that generally result from poor application of the rules of syntax, and then to identify the rule which has not been obeyed and propose an amendment and, on the other hand, to identify unknown words, while separating out proper names and barbarisms, and then propose words which are compatible for the latter. The device D actually makes it possible to answer the question "which are the words which, when substituted for a wrong word, are capable of resolving an ambiguity or an error?".

A third application relates to tools (or equipment) for voice dictation. The device makes it possible in effect to choose a solution from a number of solutions proposed by a voice recognition engine.

A fourth application relates to tools (or equipment) for generating text. The device D can in effect collaborate with a text generator based for example on the so-called "meaning⇆text theory" (or MTT).

A fifth application relates to tools (or equipment) for generating summaries.

There are at least two ways of creating a summary. The first is to create from all the documents a new text which is a condensed version of the original with a variable (but generally high) "compression rate". The second consists in extracting the pertinent sections from an original text as a function of criteria defined by a user.

The device D can calculate thematic resultants if it is coupled to a hierarchisation function and in the presence of linguistic markers.

A sixth application relates to search engines. Searching textual information, be it on a public network such as the internet or on a private company network, or on the hard disc of a personal computer, may consist in searching either for factual information, materialised by a question of the type "what is the value of . . . ?", or for texts relating to a predefined theme or subject.

In fact, in the case of factual searching, the device D can provide a suitable semantic indexing which allows a response to be produced directly. For example, all or some of the information determined by a device D can be injected into a database, then his information can be used in any operation carried out by a database management system (or DBMS), especially indexing. Moreover, this would make it possible to use requests expressed in plain language, with no restriction as to the language used (in the case of a multilingual version).

The device D can also be used, when searching for texts on certain subjects, to calculate distances on the basis of thematic resultants, and then to propose a list of pertinent documents as a function of these calculations. This type of functioning could be enriched by implementing an accuracy level.

This application may be extended to the administration of document bases for the purpose of enriching them, given that the device D can assist with the compiling of the indexes needed for the satisfactory operation of a search engine.

A seventh application relates to multilingual translators. The device D can provide a quick and reliable semantic text analysis, which resolves ambiguities of translation. Only the use of all the information contained in a text can in fact guarantee a pertinent translation, i.e. a translation that respects the meaning carried by the original text as far as possible.

The invention is not limited to the embodiments of devices for semantically analysing documents described hereinbefore, purely by way of example, but encompasses all the variants that may be envisaged by the skilled man within the scope of the claims that follow.

The invention claimed is:

1. A device Device (D) for semantic analysis of documents, comprising
   a computer device, a structural and semantic database (BD) and a document interpreter (ID) arranged so as to determine whether a document has a meaning, using said database, characterized in that the document interpreter (ID) comprises:
   an n-ary tree controller (GAN) arranged to construct a structural n-ary tree from a breakdown of a document which is to be analyzed into an ordered series of verbal entities and structural and/or semantic constraints selected from and defined in said database (BD), the structural n-ary tree comprising a root node formed by a primary governing verbal entity, and structures formed by a secondary subordinate verbal entity and attached either directly or indirectly to the root node by a link having at least one connectional characteristic, a secondary subordinate verbal entity being in turn capable of becoming a governing verbal entity,
   a semantic tree controller (GAS) arranged to determine, at least from the structural n-ary tree and the database (BD), categorizing entities of an object type and activity type, activated by certain nodes of the n-ary tree, for constructing a semantic tree provided with principal nodes made up of the categorizing entities of object and activity and linked by semantic relations arising from connectional characteristics of said n-ary tree and with which attributes are associated as a function of the characteristics of other nodes of the n-ary tree and their respective links;
   wherein the document interpreter (ID) comprises a binary tree controller (GAB) arranged to construct a structural binary tree from said breakdown of a document into an ordered series of verbal entities and structural and/or semantic constraints selected from and defined in said database (BD), the structural binary tree comprising leaves, each associated with a verbal entity of the series and constituting one of two son nodes attached to a father node, and a root node, constituting a father node and associated with all or some of the verbal entities in the series, and in that said n-ary tree controller (GAN) is arranged to construct each n-ary tree from a structural binary tree.

2. The device according to claim 1, wherein the document interpreter (ID) comprises a decomposition module (MD) arranged to break down each set of data defining a document which is to be analysed into an ordered series of verbal entities.

3. The device according to claim 1, wherein the document interpreter (ID) comprises a semantic analyser (AS) arranged to determine the semantic compatibility relations between principal nodes of the object type and/or principal nodes of the activity type of at least one semantic tree.

4. The device according to claim 3, wherein that the semantic analyser (AS) is arranged to determine the relations between principal nodes of at least one semantic tree, selected from a group comprising a spatial, temporal, causal, anaphoric and cataphoric relation.

5. The device according to claim 3, wherein that the semantic analyser (AS) is arranged to carry out a diagnosis relating to the analysis of a document and to deliver a message conveying results of the diagnosis.

6. The device according to claim 5, wherein that the diagnostic message contains information selected from a group comprising a list of difficulties encountered during the analysis of a document, different possible interpretations of a sentence, at least one unknown word, at least one grammatical error, at least one error of construction, at least one nonsensical item, and a list of unresolved ambiguities.

7. A method of semantic analysis of documents, comprising:
  constructing a structural n-ary tree from a breakdown of a document which is to be analyzed into an ordered series of verbal entities and structural and/or semantic constraints, the structural n-ary tree comprising a root node formed by a primary, governing verbal entity and structures formed by a secondary subordinate verbal entity and attached either directly or indirectly to the root node by a link having at least one connectional characteristic, a secondary subordinate verbal entity being in turn capable of becoming a governing verbal entity,
  determining, at least from the structural n-ary tree and structural and semantic data, the categorizing entities of an object type and activity type activated by certain nodes of the n-ary tree, for constructing a semantic tree provided with principal nodes consisting of the object and activity categorizing entities and linked by semantic relations arising from the connectional characteristics of the n-ary tree and associated with attributes that are a function of the characteristics of other nodes of the n-ary tree and their respective links;
  wherein before constructing an n-ary tree a structural binary tree is constructed based on the document breakdown into an ordered series of verbal entities and structural and/or semantic constraints, the structural binary tree comprising leaves, each associated with a verbal entity in the series and constituting one of two son nodes attached to a father node, and a root node, constituting a father node and associated with all or some of the verbal entities in the series, and in that each n-ary tree is constructed from a structural binary tree.

8. The method according to claim 7, wherein before constructing a binary tree or an n-ary tree, each set of data defining a document to be analysed is broken down into an ordered series of verbal entities.

9. Method according to claim 7, wherein the semantic compatibility relations between principal nodes of the object type and/or principal nodes of the activity type of at least one semantic tree are determined.

10. The method according to claim 9, further comprising determining whether the document analysed has a meaning by determining the relations between principal nodes of at least one semantic tree, selected from a group comprising a spatial, temporal, causal, anaphoric and cataphoric relations.

11. The method according to claim 7, wherein after having constructed a semantic tree a diagnosis is carried out relating to the analysis of a document and then a message is delivered that conveys results of said diagnosis.

12. The method according to claim 11, wherein the diagnostic message contains information selected from a group comprising a list of difficulties encountered during the analysis of a document, different possible interpretations of a sentence, at least one unknown word, at least one grammatical error, at least one error of construction, at least one nonsensical item, and a list of unresolved ambiguities.

* * * * *